United States Patent
Cohn et al.

(10) Patent No.: US 7,881,439 B1
(45) Date of Patent: Feb. 1, 2011

(54) CROSS-CHANNEL COMMUNICATION OF DATA COLLECTED BY CHANNEL-SPECIFIC USER INTERFACES

(75) Inventors: A. Wade Cohn, Austin, TX (US); Bran J. Vetter, Austin, TX (US); Arjun Chopra, Brookline, MA (US)

(73) Assignee: Motive, Inc., Austin, TX (US)

( * ) Notice: Subject to any disclaimer, the term of this patent is extended or adjusted under 35 U.S.C. 154(b) by 1086 days.

(21) Appl. No.: 10/734,911

(22) Filed: Dec. 12, 2003

Related U.S. Application Data

(60) Provisional application No. 60/433,043, filed on Dec. 12, 2002.

(51) Int. Cl.
  *H04M 1/24* (2006.01)
  *H04M 3/00* (2006.01)

(52) U.S. Cl. .................................. 379/9.03; 379/265.1

(58) Field of Classification Search ............ 379/265.01, 379/9.03
  See application file for complete search history.

(56) References Cited

U.S. PATENT DOCUMENTS

| | | | | |
|---|---|---|---|---|
| 4,390,953 A * | 6/1983 | Johnstone | .................... | 700/177 |
| 5,148,469 A * | 9/1992 | Price | ......................... | 340/7.28 |
| 5,506,898 A | 4/1996 | Costantini et al. | ........... | 379/266 |
| 5,884,032 A * | 3/1999 | Bateman et al. | ............. | 709/204 |
| 5,894,512 A | 4/1999 | Zenner | ........................ | 379/265 |
| 6,064,730 A | 5/2000 | Ginsberg | .................... | 379/265 |
| 6,134,318 A | 10/2000 | O'Neil | ........................ | 379/266 |
| 6,138,158 A | 10/2000 | Boyle et al. | .................. | 709/225 |
| 6,263,066 B1 | 7/2001 | Shtivelman et al. | ......... | 379/266 |
| 6,279,125 B1 * | 8/2001 | Klein | ........................... | 714/38 |
| 6,332,154 B2 | 12/2001 | Beck et al. | ................... | 709/204 |
| 6,389,132 B1 | 5/2002 | Price | ...................... | 379/265.01 |
| 6,393,015 B1 * | 5/2002 | Shtivelman | .................. | 370/352 |
| 6,456,699 B1 * | 9/2002 | Burg et al. | ............... | 379/88.17 |
| 6,477,580 B1 | 11/2002 | Bowman-Amuah | ......... | 709/231 |
| 6,574,216 B1 * | 6/2003 | Farris et al. | .................. | 370/352 |

OTHER PUBLICATIONS

Newton's Telecom Dictionary, 1994.*

* cited by examiner

*Primary Examiner*—Rasha S Al Aubaidi
(74) *Attorney, Agent, or Firm*—Hitt Gaines, PC

(57) ABSTRACT

A method, system, computer system and computer program product to interact with a user of a computer system or service via more than one communication channel, such as a telephone channel and a web channel. A determination can be made based upon information gathered via the multiple communication channels that communication between a server and one communication channel is related to communication between the server and another communication channel. Related information gathered via the multiple communication channels can be identified to form a more complete picture of information about the user's problem with a problem entity. A potential action to help the user find a solution can be determined from information gathered from all communication channels. An automated option can be provided via one of the communication channels, and an automated suggestion to select the option can be made via a coordinated communication channel.

40 Claims, 15 Drawing Sheets

CROSS-CHANNEL COMMUNICATION OF DATA COLLECTED BY CHANNEL-SPECIFIC USER INTERFACES

CROSS-REFERENCE TO RELATED APPLICATION

This application claims the benefit of priority based on U.S. Provisional Patent Application Ser. No. 60/433,043, filed Dec. 12, 2002, entitled "Coordinated Remote Computer System Diagnostics Using Internet and Telephone Channels," and naming Brian J. Vetter, A. Wade Cohn, and Arjun Chopra as the inventors. The above-referenced application is hereby incorporated by reference herein in its entirety.

COPYRIGHT NOTICE

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

This invention relates to sharing data gathered via user interfaces operating on different communication channels, such as web and telephone channels.

2. Description of the Related Art

Many businesses with a large number of computer system users provide customer service call centers to assist with computer system problems experienced by the users. Customer support may be provided by various vendors of computer software and/or hardware, by in-house personnel, and/or by a professional computer system support organization.

Examples of the types of computer system problems that a user encounters include being unable to connect his or her computer system to the Internet, launch a particular software application, send and/or receive e-mail, print to a particular printer, and so on. However, when the user telephones the customer service call center, the user often must wait for a long time for a customer service agent to become available. The customer service agent may not have the expertise or the right tools to solve the problem. Furthermore, the computer user often lacks the technical expertise to adequately describe the problem or to gather information needed by the customer service agent to fix the problem; thus, the telephone experience can be frustrating for both the computer user and the customer service agent.

Because providing customer support is very expensive, the efficiency of customer service agents is paramount. Some technical support vendors, such as Motive Communications, Inc. ("Motive"), provide call-center products that can automatically fix problems that users may have with their computers. These call center products can include a client software component installed on a user computer system and a server software component, running on a server in data communication with the user computer system via a network. The server software component directs the client software component to gather diagnostic information relating to a problem on the user computer system. Rather than telephone a customer service agent, users can use the client software component that connects with the server software component to diagnose computer system problems. Using some automated call-center products, such as those provided by Motive, the user may search a database of help information and, if desired, connect to a live customer service agent for further assistance. Motive products also provide for diagnostic information gathered during the user's search to be electronically forwarded to the agent, greatly enhancing the customer service agent's ability to diagnose the problem.

While these automated call-center systems solve the problems of automatically fixing computer problems and/or communicating electronically gathered diagnostic information to the customer service agent, many individuals are not confident about their knowledge of computers and are reluctant to use such automated call center software. Furthermore, computer users that do have automated call center software sometimes still seek help from a customer service agent via the telephone. Often the computer user prefers to have an agent provide guidance via the telephone while the user navigates the self-service application. However, requiring an agent to assist the user with the self-service interface partially defeats the purpose of providing automated self-service software, i.e., to reduce the time that agents spend on the telephone so that more time is available for diagnosing technical problems.

A solution is needed that encourages users to adopt self-service assistance with computer system, equipment and service problems. The solution should facilitate the use of multiple communication channels for gathering information by providing coordinated user interfaces and guidance for using the coordinated user interfaces.

SUMMARY OF THE INVENTION

The present invention provides a method, system, computer system, and computer program product to assist a user with gathering information via two or more communication channels, such as a web channel and a telephone channel. An association is formed between the data provided via the different channels so that all information gathered from the user is available via any of the different channels. For example, using the associated data, the user can be guided through self-service diagnosis of a problem with a computer system during a web session by an interactive voice application. An automated option provided during the web session can be determined based upon the current diagnostic information available, the automated option can be dynamically provided on a web page during the web session, and a voice application can automatically suggest to the user interactively to select the automated option. If the problem ultimately is escalated to a live agent, associated data collected via several communication channels are available so that the agent has a summary of all diagnostic information gathered thus far.

BRIEF DESCRIPTION OF THE DRAWINGS

The present invention may be better understood, and its numerous objectives, features and advantages made apparent to those skilled in the art by referencing the accompanying drawings.

FIG. 10 is an example of a web page providing a diagnostic checklist that the user can complete providing additional information collected about the user's problem entity via a web communication channel.

FIG. 11 is another example of a web page to which a user's browser can be redirected during a coordinated search session in which the user indicates a problem with a floppy disk drive.

The use of the same reference symbols in different drawings indicates similar or identical items.

DETAILED DESCRIPTION

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" mean that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not other embodiments.

Introduction

The present invention provides a method, system, computer system, and computer program product to perform cross-channel communication of data collected by channel-specific user interfaces. Data provided by the different channels can be used to dynamically change user interface options provided on the different channels. An association is formed between the data provided via the different channels so that all information gathered from the user is available via any of the different channels. For example, the user can be guided through self-service diagnosis of a problem with a computer system during a web session by an interactive voice application. An option provided during the web session can be determined based upon the current diagnostic information available, the option can be dynamically provided to the user, and a voice application can guide the user interactively to select the option. If the problem ultimately is escalated to a live agent, data collected via several communication channels are available so that the agent has a summary of all diagnostic information gathered thus far.

Figure 1A:
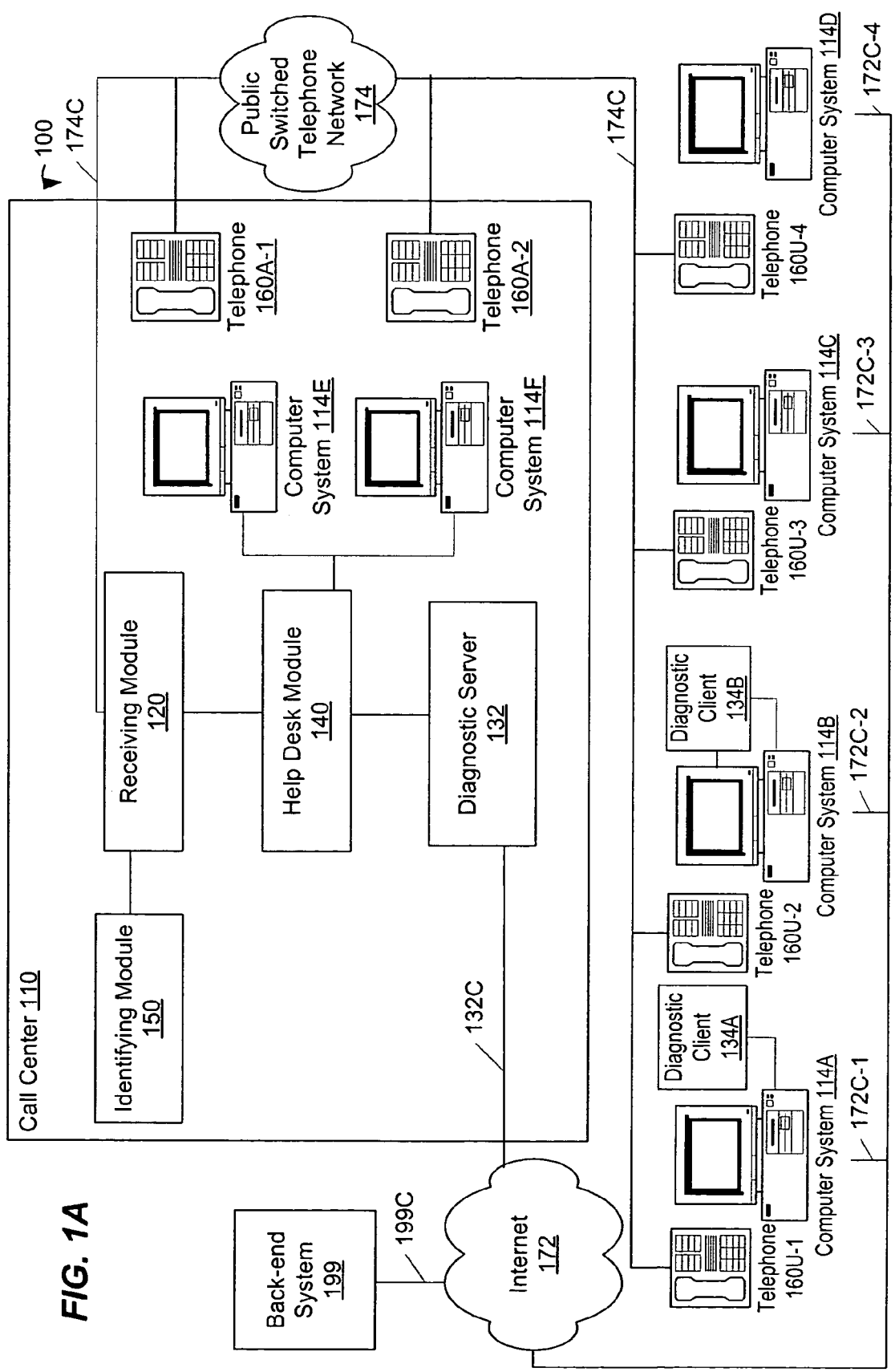
FIG. 1A shows an example of a system for remote problem diagnosis including the ability to gather data via more than one communication channel.

FIG. 1A shows an example of a system for remote computer system diagnosis including the ability to gather data via more than one communication channel. System 100 is used by agents of call center 110 to provide service to users of computer systems 114A, 114B, 114C and 114D. Each of user computer systems 114A through 114D has connectivity to Internet 172 via respective connections 172C-1, 172C-2, 172C-3, and 172C-4. The example shown in FIG. 1A shows diagnosis of the computer system itself, although one of skill in the art will recognize that other problem entities, such as equipment and/or systems related to the computer system or accessible by virtue of being coupled to a network of computer systems, may also be diagnosed using the methods and systems described herein.

Installed on computer systems 114A and 114B are diagnostic clients 134A and 134B, which are explained in further detail with reference to FIG. 1C below. Users of computer systems 114A and 114B can initiate a connection to call center 110 using diagnostic clients 134A and 134B, through connections 172C-1 and 172C-2 to Internet 172, and through connection 132C to diagnostic server 132. Users of computer systems 114A and 114B can also initiate a connection to call center 110 via user telephones 160U-1 and 160U-2 and receiving module 120 of call center 110; other modules of call center 110, such as diagnostic server 132, may then establish a connection via Internet 172 and connections 172C-1 and 172C-2 to computer systems 114A and 114B.

Computer systems 114C and 114D do not have diagnostic clients, and users of computer systems 114C and 114D use user telephones 160U-3 and 160U-4 to access call center 110 via receiving module 120. Other modules of call center 110, such as receiving module 120, may instruct the user of one of computer systems 114C and 114D to establish a connection to, for example, diagnostic server 132.

Agents in call center 110 access a help desk module 140 using computer systems such as computer systems 114E and 114F. Agents in call center 110 also speak with users via telephone via public switched telephone network (PSTN) 174 connected to user telephones 160U-1, 160U-2, 160U-3, and 160U-4 and agent telephones 160A-1 and 160A-2. Channel 174C of PSTN 174 is used herein as an example of a particular telephone channel from which a signal is received.

Help desk module 140 interacts with a diagnostic server 132 and a receiving module 120. Receiving module 120 receives input from users via a telephone channel such as channel 174C. Receiving module 120 also interacts with an identifying module 150. Each of these modules is explained in further detail below. Organization of system 100 into these various modules is merely an example, and in fact many other architectures can be implemented that achieve the same functionality.

Internet 172 provides connectivity between diagnostic server 132 and user computer systems 114A through 114D. One of skill in the art will recognize that user computer systems 114A through 114D may connect to a diagnostic or call center system such as system 100 via other types of networks; the Internet is used as an example only and is not intended to be limiting. Furthermore, one of skill in the art will recognize that equipment and/or systems accessible via Internet 172 or another network to which one of computer systems 114A through 114D is connected may also be diagnosed using the methods and systems described herein.

One of skill in the art will also recognize that another module of system 100 may provide the web server component (not shown) for communication via Internet 172. For example, diagnostic server 132, help desk module 140, or receiving module 120 may direct a user of computer system 114C or 114D to connect to a web page using a web browser (not shown), which would establish a connection to a web site via Internet 172.

Internet 172 also provides connectivity between diagnostic server 132 and other software systems, such as back-end system 199 via connection 199C. Back-end system 199 may provide information related to operation of a user computer system, such as one of user computer systems 114A through 114D. For example, back-end system 199 may provide Internet connectivity to users. Diagnostic server 132 is capable of interfacing with other software systems, such as back-end system 199, which can provide diagnostic information about other computer systems, equipment and/or computer system- or equipment-related services.

Receiving module 120 is the component that enables system 100 to receive data via a telephone channel and use that data to diagnose a problem with the calling user's computer system. Identifying module 150 uses data provided via the telephone channel and identifies the computer system associated with the calling user.

Figure 1B:
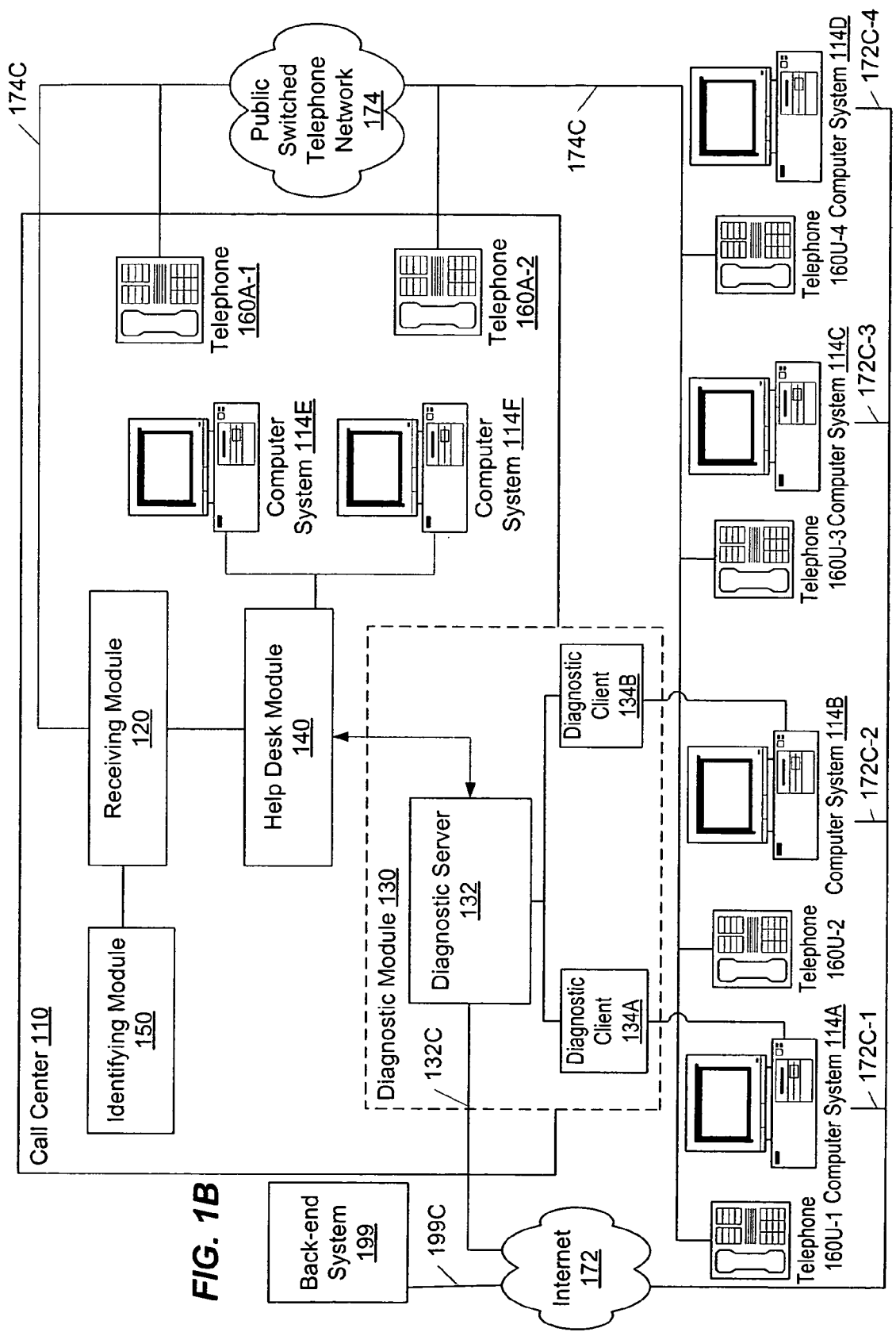
FIG. 1B shows example components of the diagnostic module of FIG. 1A.

FIG. 1B shows example components of diagnostic module 130 of FIG. 1A. Diagnostic server 132 is a server component of system 100, and diagnostic clients 134A and 134B are client-side components installed on user computer systems 114A and 114B. In one embodiment, diagnostic module 130 includes a web server component (not shown) that enables diagnostic server 132 and diagnostic clients 134A and 134B to communicate via the Internet.

Assume that a user of computer system 114A uses diagnostic client 134A to attempt to diagnose a problem with his computer system. Diagnostic server 132 can obtain diagnostic information directly from computer system 114A via diagnostic client 134A, either by running programs that are part of diagnostic client 134A or by downloading programs that can be executed by diagnostic client 134A. In one embodiment, an "incident record" is created at diagnostic server 132 for each invocation of a diagnostic client, such as one of diagnostic clients 134A and 134B, to assist with a user's computer system problem.

Figure 1C:
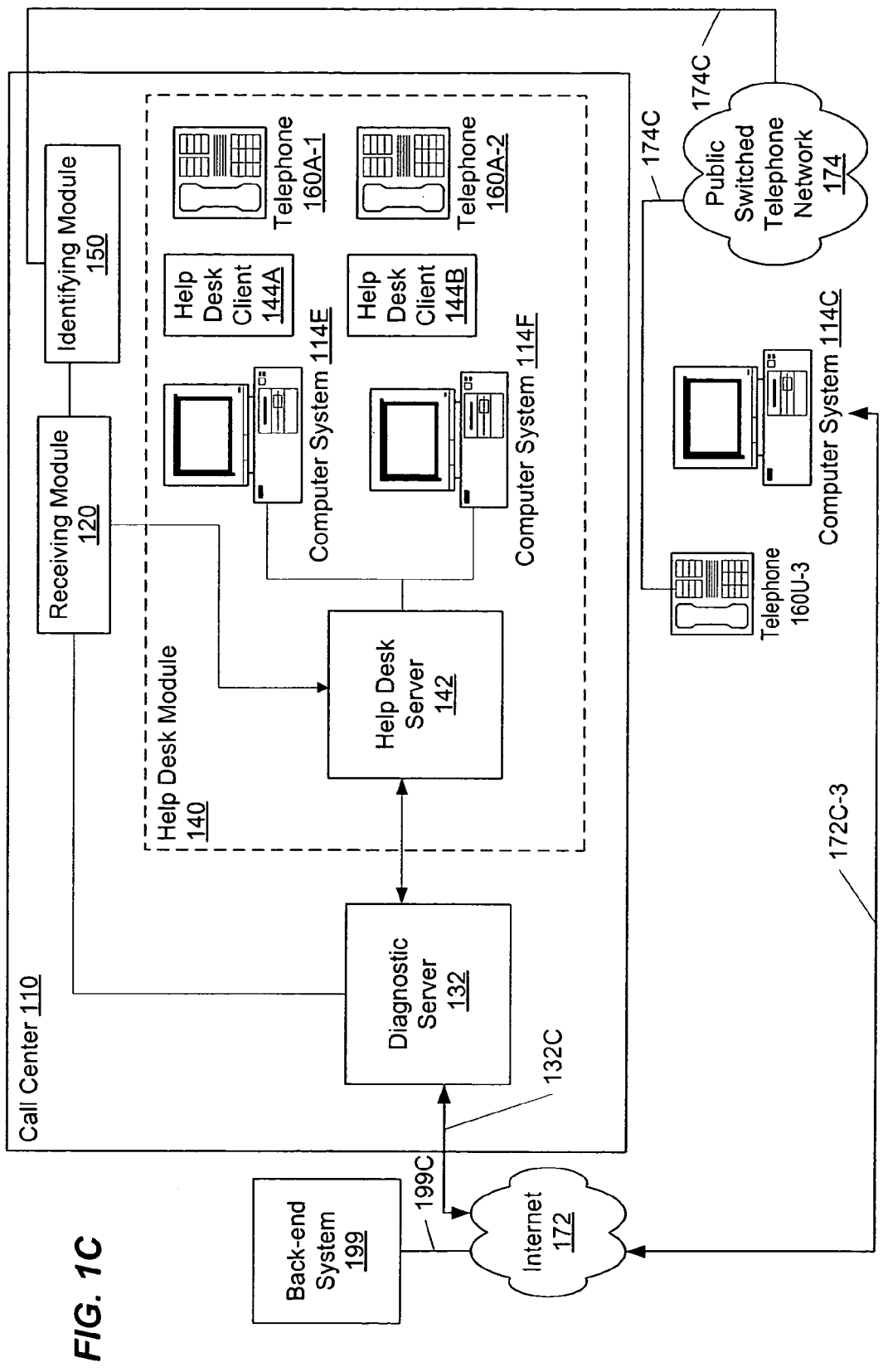
FIG. 1C shows example components of the help desk module of FIG. 1A.

FIG. 1C shows example components of help desk module 140. Help desk server 142 is a server component of help desk module 140. Help desk clients 144A and 144B are client components of help desk module 140 running on respective agent computer systems 114E and 114F. Data, such as diagnostic information gathered for a computer system, are provided from receiving module 120 to help desk server component 142. Help desk server component 142 passes the diagnostic information to help desk clients, such as help desk clients 144A and 144B, for use by agents in diagnosing a problem with the user's computer system.

In one embodiment, a help desk client (such as help desk clients 144A and 144B) enables a customer service agent to create an "incident record" to record information about the problem, user, and computer system, as well as diagnostic information gathered from the computer system and/or associated systems. Help desk clients may also include a viewer module specifically for presenting diagnostic information to agents. The viewer module can present diagnostic information gathered from the user's computer system, as well as identifying data provided over the telephone channel by the user.

In one embodiment, diagnostic information is provided in the form of a diagnostic code. As mentioned earlier, diagnostic information can be provided by running a diagnostic program on the user's computer system, equipment, and/or associated back-end system. Such a diagnostic program can be part of a diagnostic client, such as one of diagnostic clients 134A and 134B, a user may be directed to download a program from the Internet that can be run to gather diagnostic information, or a back-end system may download a program to associated equipment. Once the diagnostic program is run, the diagnostic information can be summarized in the form of a diagnostic code. The diagnostic code can, for example, summarize the type of problem discovered and/or the type of diagnoses performed and the results. The diagnostic code serves as a way to encode diagnostic information in a form that can be easily displayed on a screen or spoken over the telephone. To obtain the underlying diagnostic information and telemetry data, the diagnostic code can be decoded. The diagnostic code may be provided to the user, who can verbally provide the diagnostic code to an agent via telephone. In addition, the telemetry data resulting from decoding the diagnostic code may be provided by diagnostic server 132 to the agent via the viewer module described above.

Figure 1D:
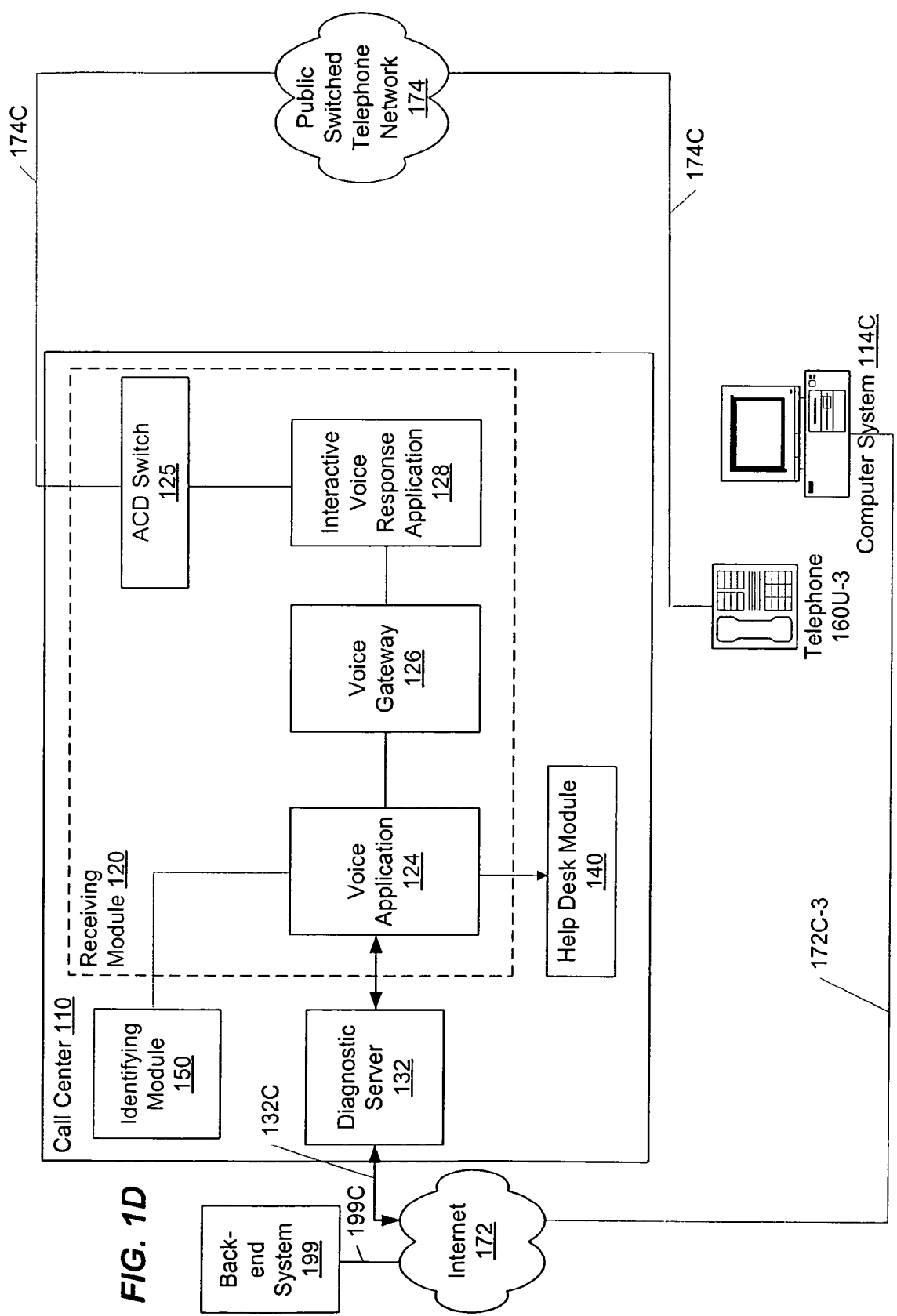
FIG. 1D shows example components of the receiving module of FIG. 1A.

FIG. 1D shows example components of receiving module 120. Assume that a telephone call is received from the user of computer system 114C via telephone 160U-3 on channel 174C. The incoming telephone call can be received by automated call distribution (ACD) switch 125 and/or interactive voice response application 128. Interactive voice response application 128 accepts input in the form of speech or via a telephone keypad, which produces DTMF tones. In one embodiment, interactive voice response application 128 and software associated with ACD switch 125 can share data and pass signals related to telephone calls to one another.

Interactive voice response applications, such as interactive voice response application 128, are commercially available today. Interactive voice response applications can be provided as part of Windows-based personal computers equipped with board-level voice gateway hardware and telephony hardware (not shown) to connect to PSTN via a T1, Plain Old Telephone Service (POTS), or Integrated Services Digital Network (ISDN) telephone connection. In one embodiment, interactive voice response application 128 resides on the same server as voice gateway 126, although interactive voice response application 128 may reside on a separate server.

Interactive voice response application 128 provides data in the form of a signal, representing either voice or a tone, such as a DTMF tone, to voice gateway 126. Voice gateway 126 interprets the signal received and passes a Hyper-Text Transfer Protocol (HTTP) request to a web server component (not shown) of voice application 124. The HTTP request may receive a response in the form of a web page that is converted to speech by voice gateway 126.

Voice application 124 may call identifying module 150 to identify the computer system or other problem entity associated with the incoming signal. For example, identifying module 150 may use the caller's name, caller ID, password, or other information provided via channel 174C to determine a unique identifier for the problem entity, corresponding to the computer system, equipment, service, or back-end system associated with the calling user. Once the problem entity is identified, data are gathered about a problem with that computer system, equipment, service, or back-end system.

Figure 2:
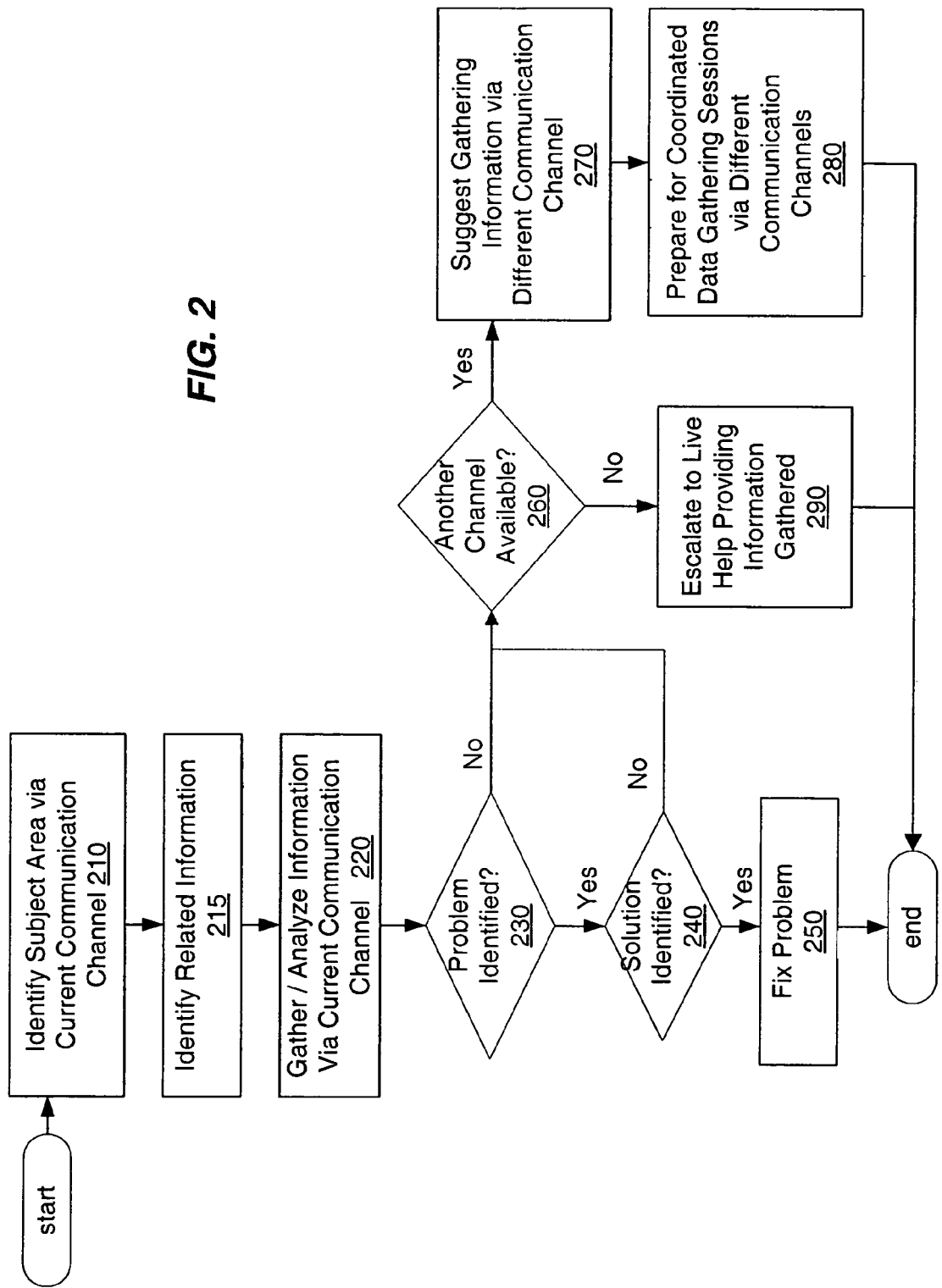
FIG. 2 is a flowchart of one embodiment of a method for diagnosing a computer system remotely using data gathered via two or more communication channels.

FIG. 2 is a flowchart of one embodiment of a method for coordinating information gathering and presentation via two or more communication channels. In "Identify Subject Area via Current Communication Channel" step 210, data are obtained from a user regarding a subject area for which information is to be gathered via a current communication channel. For example, the current communication channel can be a telephone channel, where a computer system user has called to obtain help with a problem with a computer system, service, equipment, or other problem entity. One example of a system for collecting such information is further described in U.S. patent application Ser. No. 10/349,841, filed Jan. 23, 2003, entitled "Remote Computer System and Related Equipment Diagnostics Using Data Gathered over a Telephone Channel," and naming Brian J. Vetter, A. Wade Cohn, and Arjun Chopra as the inventors. This patent application is hereby incorporated by reference herein in its entirety and for all purposes.

In the above-referenced patent application, the operation of system 100 of FIGS. 1A through 1D of the present application is described. For example, the user may input data into system 100 verbally or may use the telephone keypad to enter DTMF tones. The user may be requested to iteratively provide data items. For example, the user may be requested to provide his or her name, company, and other information that can be subsequently used to identify the user, computer system, equipment, service, and/or back-end system. The user may additionally provide a subject area, which for the described system includes a problem area or problem description; for example, the user may report a problem with e-mail using his computer system. In one embodiment of the system described therein, the identification data provided by the user are used by an identifying module, such as identifying module 150 of FIG. 1A, to identify the computer system, equipment, service, and/or back-end system. Alternatively, the user may not be requested to provide identification data; for example, system 100 may be capable of identifying the user, computer system, equipment, service, or back-end system based solely on data, such as caller ID information, that is part of the originating signal for the telephone call. The system described therein further identifies the problem entity related to the telephone call, identifies sources of diagnostic information for the problem entity, and gathers diagnostic information from the identified sources.

The methods and systems described herein are adapted to use the techniques described in the above-referenced patent application to identify and search for information related to the subject area described by the user. In addition, it is contemplated that in "Identify Subject Area via Current Communication Channel" step 210, a subject area described via the current communication channel may be identified as the same subject area that was described in a previous information gathering session conducted via a different communication channel. For example, data collected from the user may indicate an account number, problem tracking number, or other identifying information that provides an association with other data available about a problem entity and area that were collected via a different communication channel. In one embodiment, upon beginning a new data gathering session on a communication channel, the user can be asked whether an identifier has been assigned to information gathered previously for the same subject area. In other embodiments, an identifier previously assigned can be determined automatically based upon other data, such as an account number or problem tracking number, collected from the user. Each session with a server such as diagnostic server 132 establishes communication with a communication channel, and data gathered during each such communication can be associated with other data having the same identifier.

From "Identify Subject Area via Current Communication Channel" step 210, control proceeds to "Identify Related Information" step 215. It is not a requirement that information for the subject area already exist; for example, a user's initial telephone call to report a problem can be the first time for which a problem is reported with a given problem entity or area; in such a case, related diagnostic information may not exist. However, if a previously-described subject area is identified in "Identify Subject Area via Current Communication Channel" step 210, related information is identified as being associated with the same subject area in "Identify Related Information" step 215. For example, data about the problem entity may be stored in an account database or in a technical support database. This diagnostic information can include such diverse information as configuration settings on the user's computer system, versions of software installed on the computer system, information as to whether a modem of the computer system is operating correctly to provide data communication between the computer system and the Internet, or status of a data network accessed by the computer system.

In "Gather/Analyze Information via Current Communication Channel" step 220, information is gathered via the current communication channel and analyzed. It is contemplated that several information sources may be searched and search results from each information source may be analyzed as part of an iterative data gathering effort during the performance of "Gather/Analyze Information via Current Communication Channel" step 220. During this data gathering effort, the combined available information gathered from all communication channels can be used to identify additional sources of related information and/or additional search criteria for searching existing information sources. For example, a combination of search criteria may be identified that would not be identifiable when using data available via only one of the communication channels. Further information related to gathering and analyzing all available information gathered from all communication channels is described below with reference to FIG. 3.

From "Gather/Analyze Information via Current Communication Channel" step 220, control proceeds to "Problem Identified" decision point 230, where a determination is made about whether the problem can be identified based upon the information gathered thus far. If at "Problem Identified" decision point 230, a problem has been identified as a result of gathering and analyzing information via the current communication channel, control proceeds to "Solution Identified" decision point 240. At "Solution Identified" decision point 240, a determination is made whether a solution to the problem is identified. If a solution is identified, control proceeds to "Fix Problem" step 250, and the problem is fixed. For example, an updated version of a software program may be available to correct a particular error in software installed on the user's computer system; the updated version can be downloaded to the user's computer system and installed to correct the computer system problem. As another example, a hardware problem (e.g., a malfunctioning modem) may be identified as the cause of the user's computer system problem. In this example, the solution may be to forward the user's telephone call to a service department that repairs modems. In one embodiment, the user's permission to fix a problem is obtained before the problem is fixed.

At "Solution Identified" decision point 240, if a solution cannot be identified, control proceeds to "Another Channel Available" decision point 260. Similarly, if at "Problem Identified" decision point 230, if the problem was not identified by gathering and analyzing information via the current communication channel, control proceeds to "Another Channel Available" decision point 260.

At "Another Channel Available" step 260, if another communication channel to gather information for the user's subject area is not available, control proceeds to "Escalate to Live Help Providing Information Gathered" step 290. In "Escalate to Live Help Providing Diagnostic Information Gathered" step 290, information gathered during the data gathering session(s) can be electronically forwarded to a customer service agent. The agent can be provided not only a description of the user's subject area, but the agent can also view the information collected thus far, during the current data gathering session and during any previous data gathering sessions associated with the subject area. The information provided can be used by the agent for further problem diagnosis. In one embodiment, if the user is on hold on a telephone call, the call can be forwarded to the agent who can use the information as he or she converses with the user via telephone.

If at "Another Communication Channel" decision point 260, another communication channel is available, control proceeds to "Suggest Gathering Information via Different Communication Channel" step 270. A suggestion can be made, for example, via a telephone channel, to initiate a second information gathering session via another communication channel, such as a web channel. Control then proceeds to "Prepare for Coordinated Data Gathering Sessions via Different Communication Channels" step 280.

In "Prepare for Coordinated Data Gathering Sessions via Different Communication Channels" step 280, data from the current data gathering session are saved, identifying the subject area, such as the problem entity and problem area. In one embodiment, to prepare for coordinated data gathering sessions, an identifier is assigned to the information gathered via the current communication channel. This identifier can be used to collectively associate all data gathered during the current data gathering session as related to a given subject area. Such an identifier may generally identify the user, problem/entity, and/or account, or the identifier may specifically identify the problem being investigated. In one embodiment, a problem tracking number is assigned for the problem and is associated with an account number for the user. In addition to assigning an identifier that can be used to relate the data gathered via the current information channel with other related information, steps may be taken to initialize receiving module 120 and/or diagnostic module 130 of FIGS. 1A-1D for establishment of communication related to the subject area via the suggested communication channel. "Prepare for Coordinated Data Gathering Sessions via Different Communication Channels" step 280 of FIG. 2 is discussed in further detail with reference to FIG. 4.

Referring again to FIG. 2, when a subsequent data gathering session is determined to be associated with the same problem entity and problem area in "Identify Subject Area via Current Communication Channel" step 210, the problem-specific identifier can be used to associate all of the data gathered during the data gathering session with the problem entity and area in "Identify Related Information" step 215.

Figure 3:
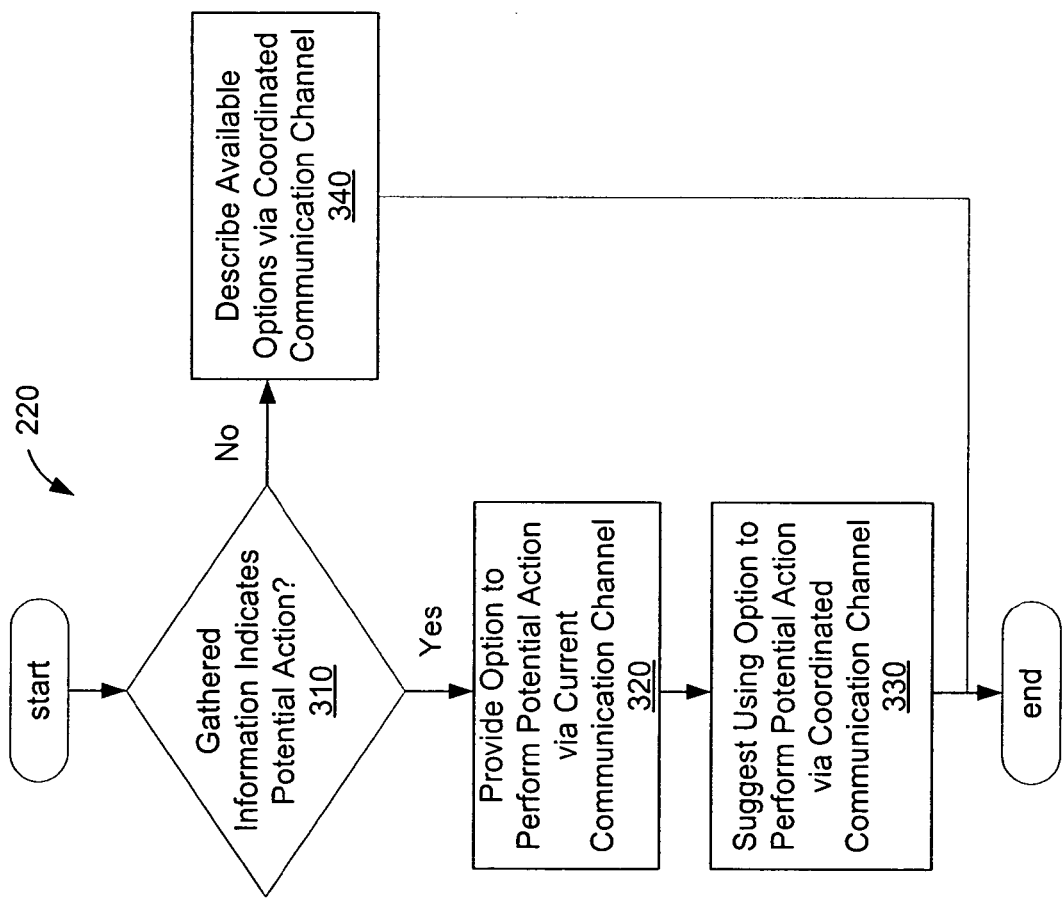
FIG. 3 is a flowchart of one embodiment of the "Gather/Analyze Diagnostic Information via Current Communication Channel" step of the flowchart of FIG. 2.

FIG. 3 is a flowchart of one embodiment of the "Gather/Analyze Diagnostic Information via Current Communication Channel" step 220 of the flowchart of FIG. 2. In "Gathered Information Indicates Potential Action" decision point 310, a determination is made whether the combined information available from all communication channels indicates a potential action that could be used to fix the problem and/or find additional information related to the subject area. If a potential action can be determined using the existing information, control proceeds to "Provide Option to Perform Potential Action via Current Communication Channel" step 320.

In "Provide Option to Perform Potential Action via Current Communication Channel" step 320, an option is provided to perform the potential action. Depending upon the information available, the potential action may be to gather additional information via the current communication channel using a search criterion identified from the information gathered via other communication channels. For example, if the current communication channel is the web channel, the user may be provided with a menu option to search using the search criterion. If the current communication channel is the telephone channel, a voice message can be provided requesting whether the user wishes to use the search criterion to gather additional information. Control then proceeds to "Suggest Using Option to Perform Potential Action via Coordinated Communication Channel" step 330. When a second communication channel is actively being used to gather information in addition to the current channel providing the search option, a message can be provided via the second communication channel suggesting that the user gather additional information using the option. For example, the web menu option can be pointed out via a voice message via the telephone channel, or a pop-up message can be provided via the web channel requesting the user to perform the action suggested via the telephone. This coordinated interaction of information gathering interfaces helps guide the user to find a solution using self-service tools rather than escalate the problem to a help desk agent.

At "Gathered Information Indicates Potential Action" decision point 310, if no additional action can be proposed using the existing diagnostic information, control proceeds to "Describe Available Options via Coordinated Communication Channel" step 340. Even though a new menu option is not provided via one of the communication channels, the verbal description of the options on the menu can encourage the user to use the self-service solution rather than call an agent.

Figure 4:
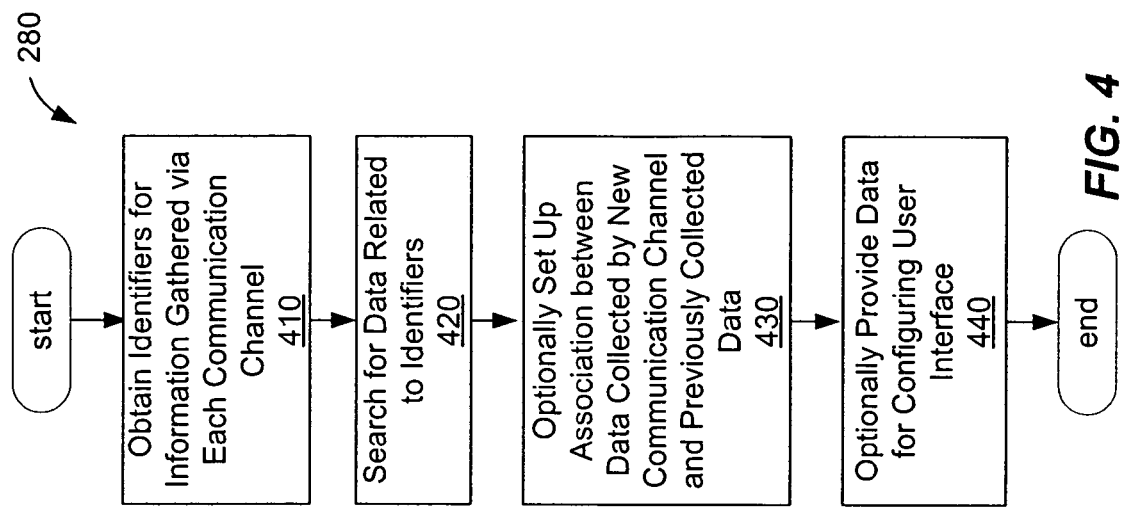
FIG. 4 is a flowchart of one embodiment of the "Prepare for Coordinated Data Gathering Sessions via Different Communication Channels" step of the flowchart of FIG. 2.

FIG. 4 is a flowchart of one embodiment of the "Prepare for Coordinated Data Gathering Sessions via Different Communication Channels" step 280 of FIG. 2. In "Obtain Identifiers for Information Gathered via Each Communication Channel" step 410, identifiers for data related to the subject area can be obtained. For example, a user may be prompted for a problem tracking number previously assigned to earlier diagnostic efforts related to a problem entity and problem area. Alternatively, the user may be prompted for information such as an account number that can be used to identify the data related to that account number. In addition, the system may be able to retrieve such identifiers based upon information provided by the user; for example, an account number or the source telephone number may identify not only the user but also any previous problem tracking numbers or other identifying information related to a problem entity associated with the user. From "Obtain Identifiers for Information Gathered via Each Communication Channel" step 410, control proceeds to "Search for Data Related to Identifiers" step 420.

In "Search for Data Related to Identifiers" step 420, a data store for data related to the identifiers obtained in "Obtain Identifiers for Information Gathered via Each Communication Channel" step 410 can be searched to determine whether additional information has already been collected about the subject area. Depending upon the nature of the search results, it may be desirable to associate information subsequently gathered via a new communication channel with the existing data already available about the subject area. This process is represented by "Optionally Set Up Association between Data Collected by New Communication Channel and Previously Collected Data" step 430. For example, a key field or identifier associated with the previously collected data, such as a problem tracking number, can be identified for association with a key field or identifier formed from data collected via the new communication channel. The key field or identifier associated with the previously collected data can then be associated with the newly-formed key field or identifier in a relationship table, preserving the relationship between the related data items.

Control proceeds from "Optionally Set Up Association Between Data Collected by New Communication Channel and Previously Collected Data" step 430 to "Optionally Provide Data for Configuring User Interface" step 440. For example, it may be possible to initialize the new communication channel to provide information gathering options via the user interface that are targeted to the current context of the data gathering and analysis effort. When the new communication channel is a web channel, for example, a web page pertaining to the user's problem with e-mail can be presented rather than a generic home page. In effect, upon establishing a connection with system 100, the user's browser can be redirected to a context-appropriate web page based upon information already gathered via other communication channels. Browser redirection is discussed in further detail below with reference to FIGS. 7 and 8.

Generally, identifiers for data related to one or more communication sessions can be obtained and compared. If the identifiers are the same, the related data can be used to perform an action during one or more of the communication sessions. For example, if the data includes a diagnostic code, the action performed can be to provide telemetry data or other diagnostic information decoded from the diagnostic code. The telemetry data and/or diagnostic information can be provided for viewing by users, via a module such as the viewer module described above. The action may be to provide other data obtained using one of the identifiers; for example, the identifiers may be used to look up additional data in a database, and that additional data can be provided during one or more of the communication sessions. In addition, the action may include providing an automated option during one of the communication sessions. Furthermore, the information may include providing an automated suggestion to select an automated option provided during one or more of the communication sessions.

Information gathered via the coordinated communication channels can be used to identify a location to which to direct the user in a self-service information gathering session, such as a web session. For example, a diagnostic code can be decoded to identify diagnostic information resulting from a particular set of diagnostic tests performed on the problem entity. Each test in that particular set of diagnostic tests can be represented as a unique web page (or other user interface option) during the self-service communication session. For example, a different set of diagnostic tests may be performed depending upon the user's account information, Internet Service Provider, e-mail client, and so on. This collection of web pages, or other portions of a user interface representing a particular set of diagnostic tests and/or test results, is referred to herein as a work flow. Information gathered via the coordinated communication channels can be associated with one or more locations in one or more work flows.

Figure 5:
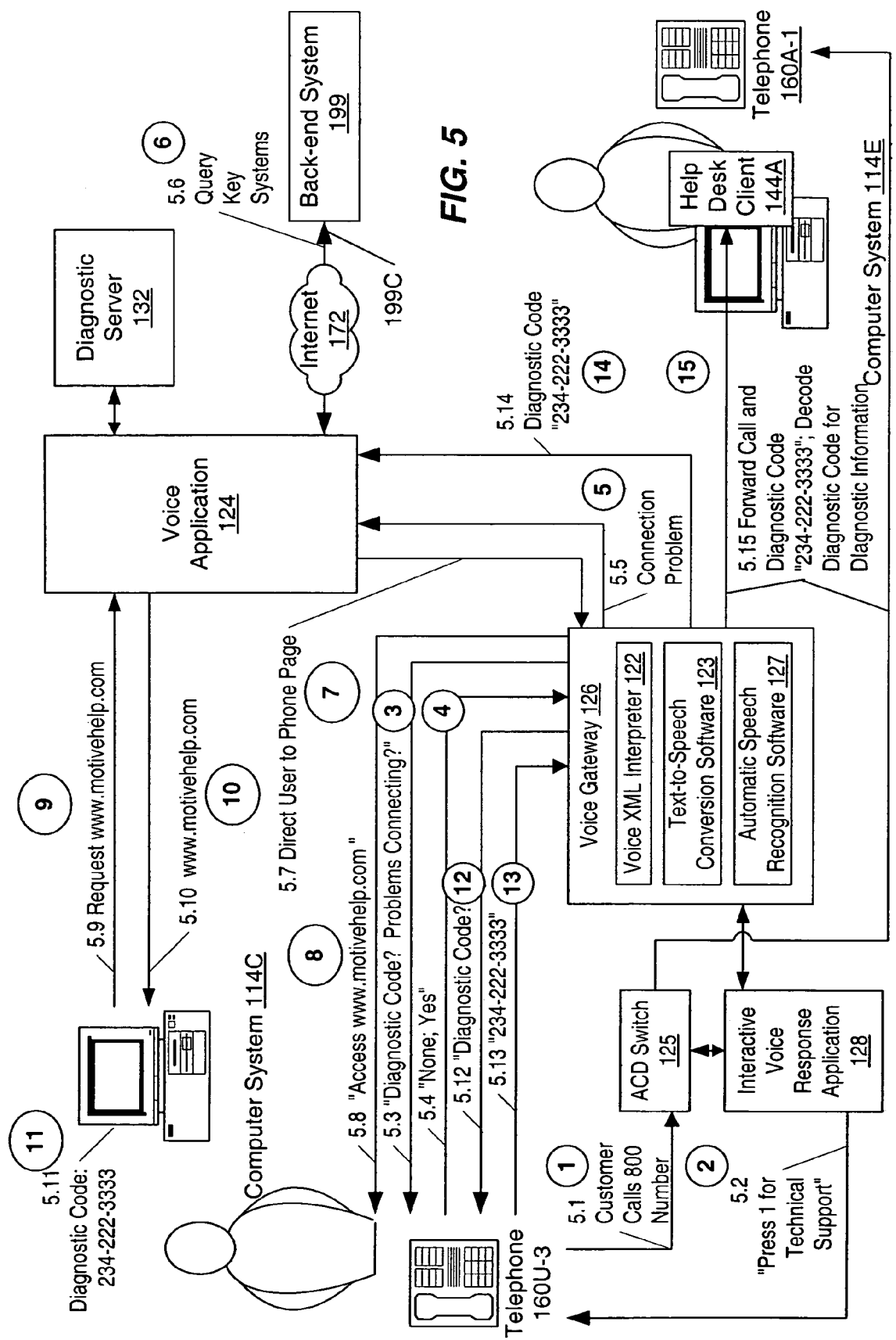
FIG. 5 is an example of a data flow including presentation of a diagnostic code summarizing diagnostic information to a user.

FIG. 5 is an example of a data flow including presentation of a diagnostic code to a user. Encircled guide numbers are provided in FIGS. 5 through 8 to aid the reader in following the data flows. In this example, a diagnostic code summarizing diagnostic information is provided vocally by a user via the telephone to voice gateway 126 in response to a prompt for the diagnostic code. In this example, the diagnostic code results in forwarding the call and the diagnostic information gathered to an agent using help desk client 144A. In FIGS. 5 through 8, only a subset of the components shown in FIGS. 1A-1D, 3, and 4 are shown. One of skill in the art will recognize that intermediate components may exist that are not shown, and that some of the actions shown may pass through intermediate components even though the action appears to go directly from one illustrated component to another.

In action 5.1, a user of computer system 114C uses telephone 160U-3 to call customer support. The signal is communicated between ACD switch 125 and Interactive Voice Response Application 128. In action 5.2, the user is directed to press 1 for technical support, which the user does (not shown). A DTMF tone from the telephone signal is provided (not shown) to voice gateway 126.

After several interactions (not shown) between the user and voice gateway 126, voice gateway 126 sends a voice message to the user pertaining to data that has been provided during the interactions between the user and voice gateway 126. For example, in action 5.3, voice gateway 126 sends a voice message asking whether the user has a diagnostic code and whether the user is having problems connecting. In action 5.4, the user responds "None," indicating that he or she does not have a diagnostic code, and "yes," indicating that he or she is having problems connecting. In this particular example, the user is experiencing problems connecting to a particular service provided via the Internet, although the user can access other web sites on the Internet. In action 5.5, voice gateway 126 passes information from the user's response to voice application 124, which initiates queries of key systems, such as back-end system 199, in action 5.6. One of skill in the art will recognize that the initiation of queries by voice application 124 may involve one or more intermediate steps requesting another component, such as diagnostic server 132, to gather diagnostic information. Diagnostic information is gathered from back-end system 199, and possibly other diagnostic sources.

In action 5.7, voice application 124 sends a message to voice gateway 126, indicating that voice gateway 126 should direct the user to access a phone page. In action 5.8, voice gateway 126 directs the user to access the phone page available at uniform resource locator (URL) www.motivehelp.com, as generally described with reference to "Suggest Gathering Information via a Different Communication Channel" step 270 of FIG. 2. In action 5.9, the user requests the phone page using a browser (not shown) running on computer system 114C. In action 5.10, a web server (not shown) operating in conjunction with voice application 124 returns the web page associated with the URL requested in action 5.9. A diagnostic code is generated and presented to the user via the phone page on computer system 114C in action 5.11.

In action 5.12, voice gateway 126 sends a voice message to the user (via telephone channel 174C, not shown) asking whether the user has been presented with a diagnostic code. The user provides the diagnostic code in action 5.13, and voice gateway 126 presents the diagnostic code to voice application 124 in action 5.14. In action 5.15, the diagnostic code and telephone call are forwarded from voice application 124 and ACD switch 125, respectively, to an agent using help desk client 144A and telephone 160A-1. The diagnostic code is decoded to provide diagnostic information obtained via diagnostic efforts conducted thus far.

This scenario demonstrates several potential savings to an organization using the present invention. The data gathered via various communication channels may enable voice application 124 and diagnostic server 132 to determine a fix for the problem and automatically fix the computer system problem without involving an agent. When a solution cannot be automatically determined based upon information gathered thus far, the user can be directed to a self-service solution by being instructed to use another communication channel to gather additional information about the problem; for example, the user may be requested to access a phone page, thereby establishing a web channel connection. When the problem cannot be fixed based upon data gathered all of the available communication channels, the diagnostic code can be provided to the agent and decoded to obtain the encoded diagnostic information, as shown in action 5.15, saving the agent's time by summarizing diagnostic efforts and results thus far.

Figure 6:
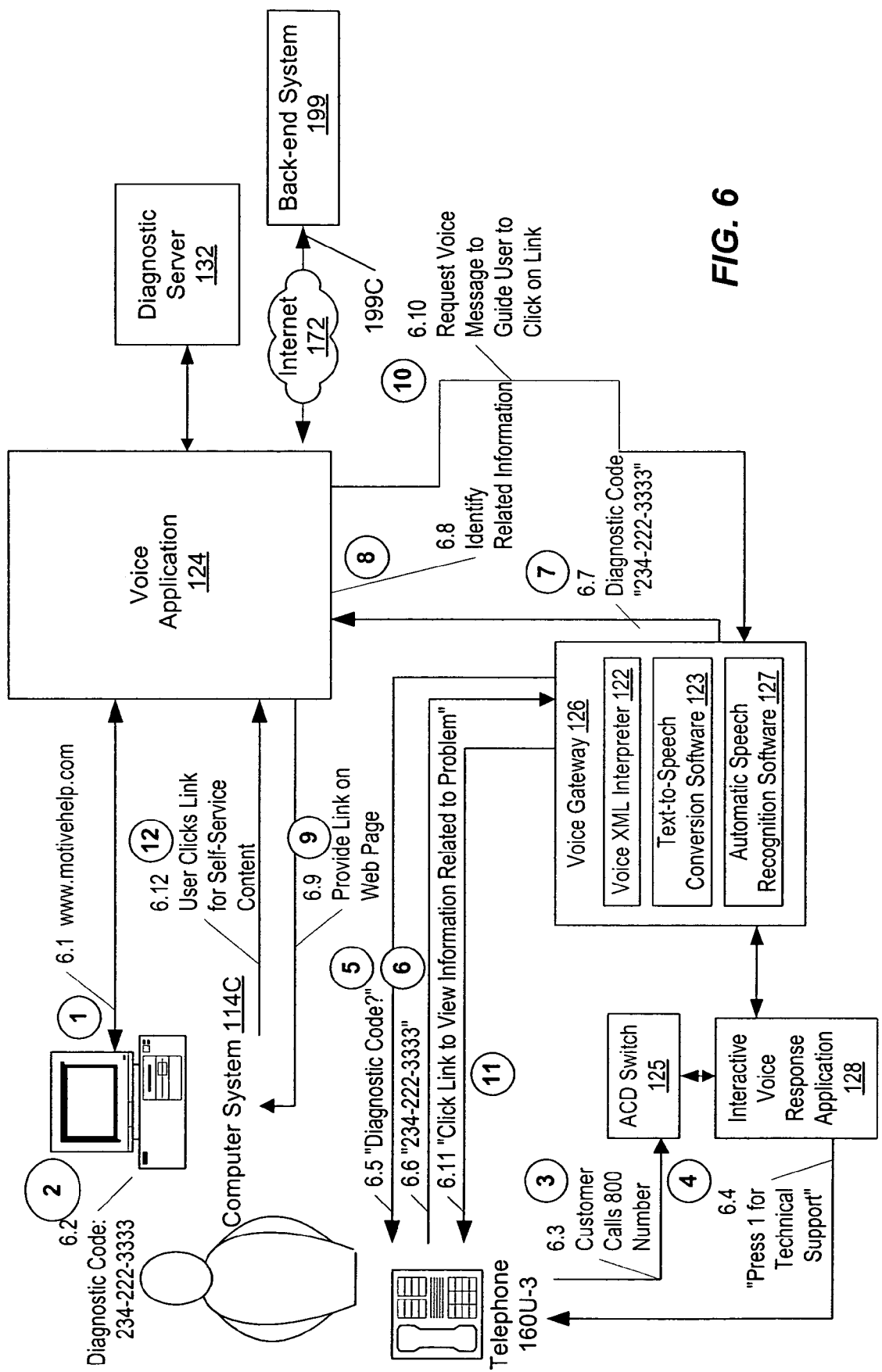
FIG. 6 is an example of a data flow during a coordinated search session using two communication channels to search for diagnostic information related to a problem with a user's problem entity.

FIG. 6 is an example of a data flow during a coordinated search session using two communication channels to search for diagnostic information related to a problem with the user's computer system. In this example, an identifier assigned to the data gathered is used to identify the problem entity and area previously determined, as described with reference to "Prepare for Coordinated Data Gathering Sessions via Different Communication Channels" step 280.

In action 6.1, the user accesses the web page at URL www.motivehelp.com. After several interactions with the self-help web pages, in action 6.2, the user is provided with a diagnostic code. In this example, a web channel data gathering session is established prior to establishing a telephone connection.

In action 6.3, a user of computer system 114C uses telephone 160U-3 to call customer support. The signal is communicated between ACD switch 125 and Interactive Voice Response Application 128. In action 6.4, the user is directed to press 1 for technical support, which the user does (not shown). A DTMF tone from the telephone signal is provided (not shown) to voice gateway 126.

In action 6.5, voice gateway 126 asks the user whether he or she has a diagnostic code, and in action 6.6, the user provides the diagnostic code obtained in action 6.2 to voice gateway 126. In action 6.7, voice gateway 126 presents the diagnostic code to voice application 124.

In action 6.8, voice application 124 and diagnostic server 132 use the data encoded in the diagnostic code to identify additional information that can be used to further diagnose the computer system problem, as generally described with reference to "Diagnostic Information Indicates Potential Action" decision point 310 of FIG. 3. For example, given information gathered via the phone channel and the web channel, diagnostic server 132 may determine that an additional diagnostic test is available to further diagnose the user's problem. In one embodiment, voice application 124 provides a web page including a link, or option, in action 6.9 to perform the additional diagnostic test. This web page and link are provided via a browser (not shown) running on computer system 114C. One of skill in the art will understand that voice application 124 either includes web server functionality or operates in conjunction with a web server (not shown) to provide a web page having the link described in action 6.9. This action serves as an example of the "Provide Option to Perform Potential Action via Current Communication Channel" step 320 of FIG. 3.

In contrast to providing a new web page or refreshing an existing web page to add a link to the additional diagnostic test, it is possible that a link to perform the potential action already appears on the current web page. In such a situation, voice application 124 can suggest that the user click on the link. Alternatively, if a fix for the problem is determined from the diagnostic information, voice application 124 may perform the fix automatically or ask the user whether to perform the fix, without requiring the user to click on a link.

In the scenario described with reference to FIG. 6, a link is provided on a new or existing web page. In action 6.10, voice application 124 requests voice gateway 126 to generate a voice message to request the user to click on the link provided, as described with reference to "Suggest Using Information Gathering Option via Coordinated Communication Channel" step 330 of FIG. 3. Actions 6.8, 6.9, and 6.10 coordinate the data obtained and provided via Internet and telephone channels to provide the user with available tools for diagnosing the computer system problem via the web-based user interface. In effect, the user's web browser session and the data collected in the web browser session are associated with the data obtained via the telephone call. The association between the data collected via the web and telephone channels can lead to additional information that may not have been identified using the data collected via only one channel.

In action 6.11, the voice message requesting the user to click on the link is provided via voice gateway 126 to the user's telephone 160U-3 via telephone channel 174C (not shown). When the user clicks on the link in action 6.12, the user accesses a web page (not shown) provided by a web server associated with voice application 124 and/or diagnostic server 132. The web page corresponds to the web page identified using the diagnostic code in action 6.8.

It is possible that the user may be able to solve the problem completely via the automated self-service system. If not, diagnostic information gathered previously, in addition to diagnostic information gathered via the additional diagnostic test, can be provided to an agent. The results of diagnostic tests run and data gathered via both the web and telephone channels are available to the agent without the need for the agent to repeat any of these tests.

One of skill in the art will understand that actions 6.5 (obtaining a diagnostic code from the user via telephone) through 6.12 can be repeated as a series of web pages, with each web page presenting a web page-specific diagnostic code. In one embodiment, the diagnostic code describes not only the diagnostic tests and results obtained thus far, as described above, but also communicates a location (for example, a web browser page) within the web session and options available to the user at that location. This coordinated activity between the communication channels enables voice application 124 to generate and provide web page-specific guidance to the user regarding a particular link to click or other action to take. As noted above, communicating data between communication channels (here the telephone and web channels), where the data are collected via channel-specific user interfaces, enables the user to obtain specific guidance for the web pages he or she is viewing from an automated voice application.

This scenario demonstrates potential savings to an organization using the present invention. Providing a link to run an additional diagnostic test or perform additional data gathering may enable voice application 124 and diagnostic server 132 to determine a fix for the problem and automatically fix the problem without involving an agent. The guidance provided by the coordinated web and telephone communication sessions may inspire a user to find a solution without contacting an agent. Furthermore, savings are produced when the problem cannot be fixed, but diagnostic information gathered via the telephone channel, the web channel, and the user's browser are provided to the agent.

Figure 7:
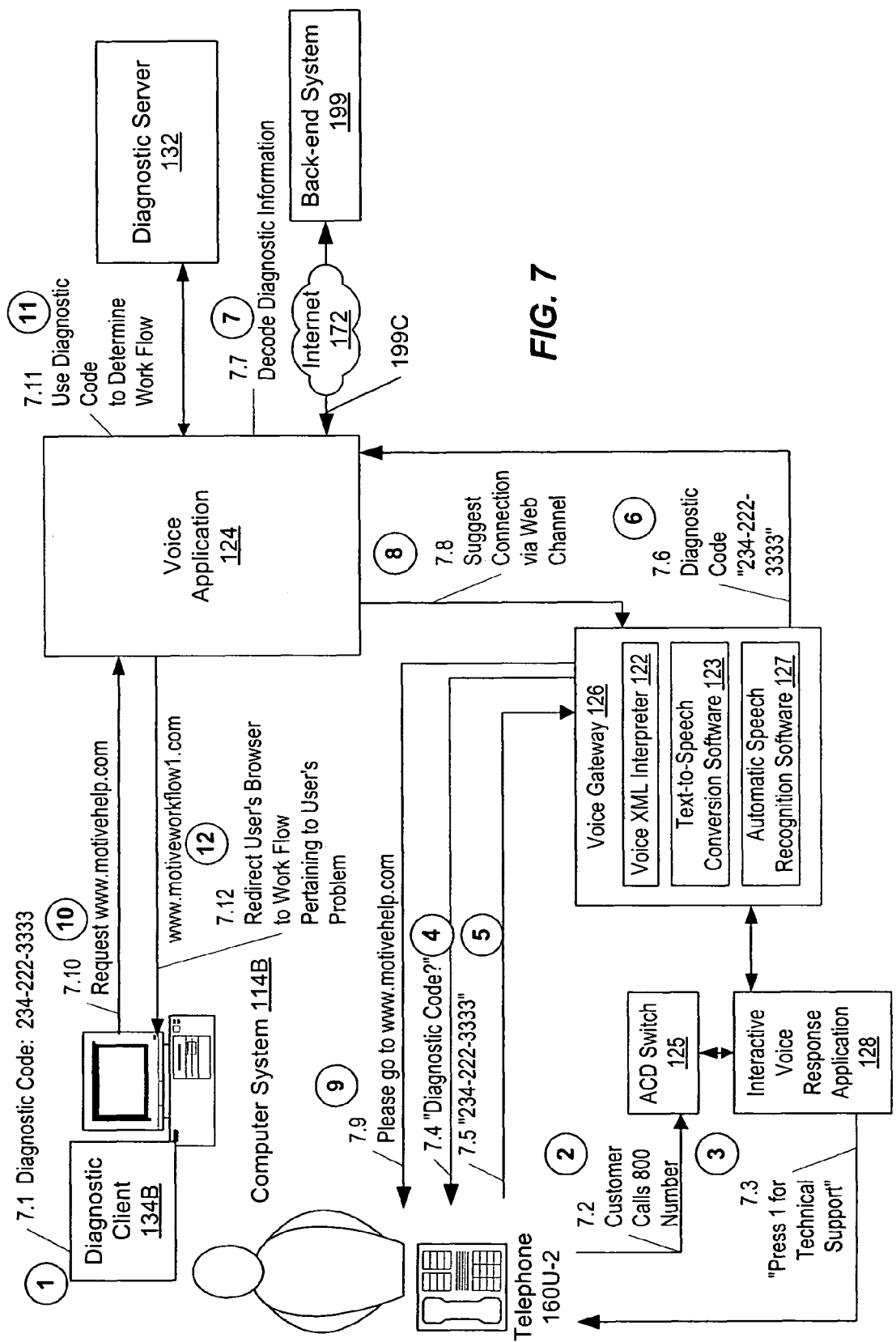
FIG. 7 shows redirection of a user's browser based upon information derived using a diagnostic code provided during a coordinated search session with web and telephone channels.

FIG. 7 shows redirection of a user's browser based upon information derived using a diagnostic code provided during a coordinated search session with web and telephone channels. Browser redirection can be performed based solely upon selection of a problem area (for example, problem receiving e-mail) and/or problem description. In the example shown in FIG. 7, the diagnostic code is provided by a diagnostic client running on the user's computer system before the user establishes communication with a server. The user then establishes a telephone connection and provides the diagnostic code vocally via the telephone to voice gateway 126 in response to a prompt for the diagnostic code. The diagnostic code is used to determine a location (web page) in a self-service work flow to which the user's browser is redirected.

As an example of using the diagnostic code to identify a location in a self-service web flow, the diagnostic code can be decoded to identify diagnostic information resulting from a particular set of diagnostic tests performed on the problem entity. Each test in the particular set of diagnostic tests can be represented as a unique web page during a web session for gathering information about the problem entity. For example, a different set of diagnostic tests may be performed depending upon the user's account information, Internet Service Provider, e-mail client, and so on. This collection of web pages, or other portions of a user interface representing a particular set of diagnostic tests and/or test results, is referred to herein as a work flow.

In action 7.1, diagnostic client 134B running on computer system 114B provides a diagnostic code to the user. The user is not connected to a server at the time that the diagnostic code is provided. In action 7.2, the user of computer system 114B uses telephone 160U-2 to call customer support. The signal is communicated between ACD switch 125 and Interactive Voice Response Application 128. In action 7.3, the user is directed to press 1 for technical support, which the user does (not shown). A DTMF tone from the telephone signal is provided (not shown) to voice gateway 126.

After several interactions (not shown) between the user and voice gateway 126, voice gateway 126 sends a voice message to the user asking whether the user has a diagnostic code, as shown in action 7.4. In action 7.5, the user responds with the diagnostic code. In action 7.6, voice gateway 126 passes the diagnostic code to voice application 124, which decodes the diagnostic information encoded therein. Based upon the diagnostic information encoded in the diagnostic code, a determination is made that additional information should be gathered to further investigate the problem.

In action 7.8, voice application 124 sends a message to voice gateway 126, indicating that voice gateway 126 should suggest that the user establish a connection via a web channel. In action 7.9, voice gateway 126 directs the user to access a home page for self-service diagnosis, www.motivehelp.com in this example, as generally described with reference to "Suggest Gathering Information via Different Communication Channel" step 270 of FIG. 2. In action 7.10, the user requests the web page using the URL provided by voice application 124 using a web browser (not shown) running on computer system 114B.

In action 7.11, voice application 124 works in conjunction with diagnostic server 132 using the diagnostic code provided by the user via the telephone channel to determine a location (web page) in the self-service work flows available via the home page for self-service diagnosis. The diagnostic code and the diagnostic information decoded in action 7.7 can be used to identify a specific web page within a particular work flow appropriate for diagnosing the user's problem. Upon determining the web page in response to the user's request, the user's browser is redirected to a URL associated with the location determined by voice application 124 in action 7.12, rather than to a web page associated with the URL provided by the user in action 7.10.

The examples of FIGS. 5 through 7 illustrate the use of a diagnostic code, generated either by a diagnostic client or a diagnostic test downloaded as part of a web page. As mentioned previously, the user may provide a problem area or problem description instead of a diagnostic code or other identifier, and the problem area and/or problem description can be used to determine a location within a self-service work flow. In contrast, the example in FIG. 8 does not require the user to provide a diagnostic code, problem area, and/or problem description.

Figure 8:
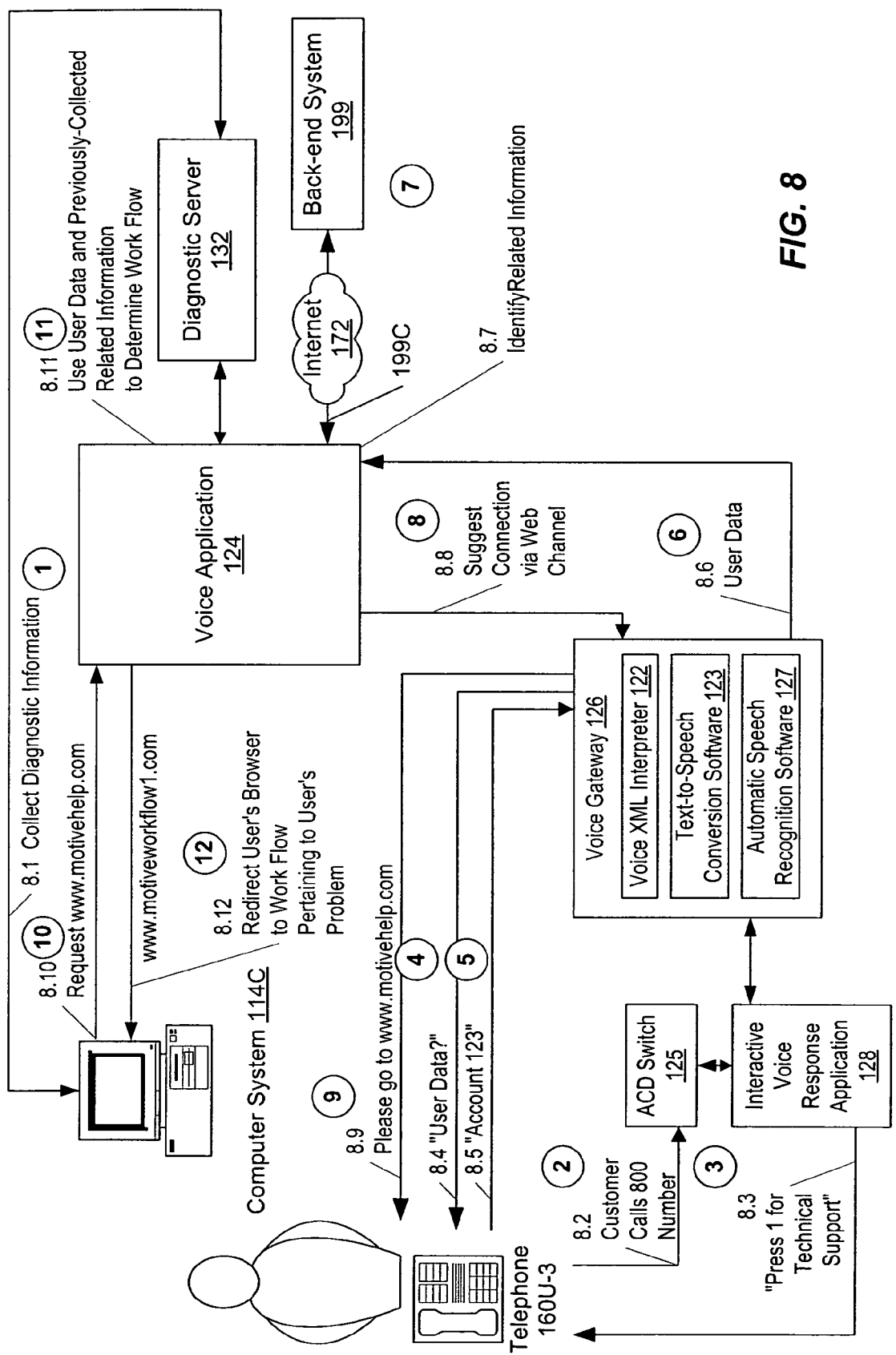
FIG. 8 shows a data flow where information is gathered during communication conducted between a server and a communication channel in the background, such that no information about previous communication with the server need be provided by the user.

FIG. 8 shows a data flow where information is gathered during communication conducted between a server and a communication channel in the background, such that no information about previous communication with the server need be provided by the user. The information gathered in the background is used to coordinate communication sessions via web and telephone channels. Action 8.1 shows communication between the user via computer system 114C and diagnostic server 132 to gather information via a web channel. In action 8.2, the user of computer system 114B uses telephone 160U-3 to call customer support. The signal is communicated between ACD switch 125 and Interactive Voice Response Application 128. In action 8.3, the user is directed to press 1 for technical support, which the user does (not shown). A DTMF tone from the telephone signal is provided (not shown) to voice gateway 126.

After several interactions (not shown) between the user and voice gateway 126, voice gateway 126 sends a voice message to the user asking the user for data identifying the user. In action 8.5, the user responds with user data in the form of an account number, although user data can be any form of identifier for the user, the user's computer system, and/or the user's problem entity. In action 8.6, voice gateway 126 passes the user data to voice application 124, which identifies related information in action 8.7. This related information may include telemetry data generated as a result of running previous diagnostic software on the user's problem entity, which can include more detailed information than can be summarized in a user-friendly diagnostic code. Identifying related information was discussed in further detail with reference to "Identify Related Information" step 215 of FIG. 2. One of skill in the art will recognize that identifying related information by voice application 124 may involve one or more intermediate steps requesting another component, such as diagnostic server 132, to identify related information.

At this point, the information previously collected can be forwarded to an agent along with the telephone call, and the agent will have access to all telemetry data previously gathered for the user. Alternatively, the system can direct the user to first try self-service work flows, and the previously-collected information can be used to guide the user to an appropriate location in the self-service work flows, as will be discussed in the remaining discussion of FIG. 8.

In action 8.8, voice application 124 sends a message to voice gateway 126, indicating that voice gateway 126 should suggest that the user establish a connection via a web channel. In action 8.9, voice gateway 126 directs the user to access a home page for self-service diagnosis, www.motivehelp.com in this example, as generally described with reference to "Suggest Gathering Information via Different Communication Channel" step 270 of FIG. 2. In action 8.10, the user requests the web page using the URL provided by voice application 124 using computer system 114C. In some embodiments, additional information, such as user information, can be obtained by agents running on computer system 114C and provided along with the request as query parameters for the web page. Such agents may be included as part of a diagnostic client, such as one of diagnostic clients 134A or 134B of FIG. 1A. Alternatively, such agents may be downloaded within a web page from a web server operating in conjunction with diagnostic server 132. An example of an agent that can be downloaded within a web page is an ActiveX control.

In action 8.11, voice application 124 works in conjunction with diagnostic server 132 using the user data and the previously-collected related information to determine a location (such as a URL for a web page) in the self-service work flows available via the home page for self-service diagnosis. The user data and the related information identified in action 8.7 provide information that relates to the user's specific problem and can be used to identify a specific web page within a particular work flow appropriate for diagnosing the user's problem. Because the related information can include detailed telemetry data, it may be possible to identify a location within the work flow more accurately. Upon determining the web page in response to the user's request, the user's browser is redirected to a web page from the location determined by voice application 124 in action 8.12, rather than to the URL provided by the user in action 8.10.

Browser redirection, such as that described with reference to FIGS. 7 and 8, can be performed upon the user's initial establishment of a web channel connection, or at any point during communication with the server via the web channel. For example, a diagnostic test run on the user's computer system or problem entity may provide information that causes diagnostic server 132 to determine that a different self-service work flow is more appropriate for gathering information about the user's problem than the self-service work flow in which the user is currently gathering information. In such a case, a voice message can be provided to the user via voice application 124 indicating that the user's browser is being redirected to a different self-service work flow based upon information gathered thus far.

Figure 9:
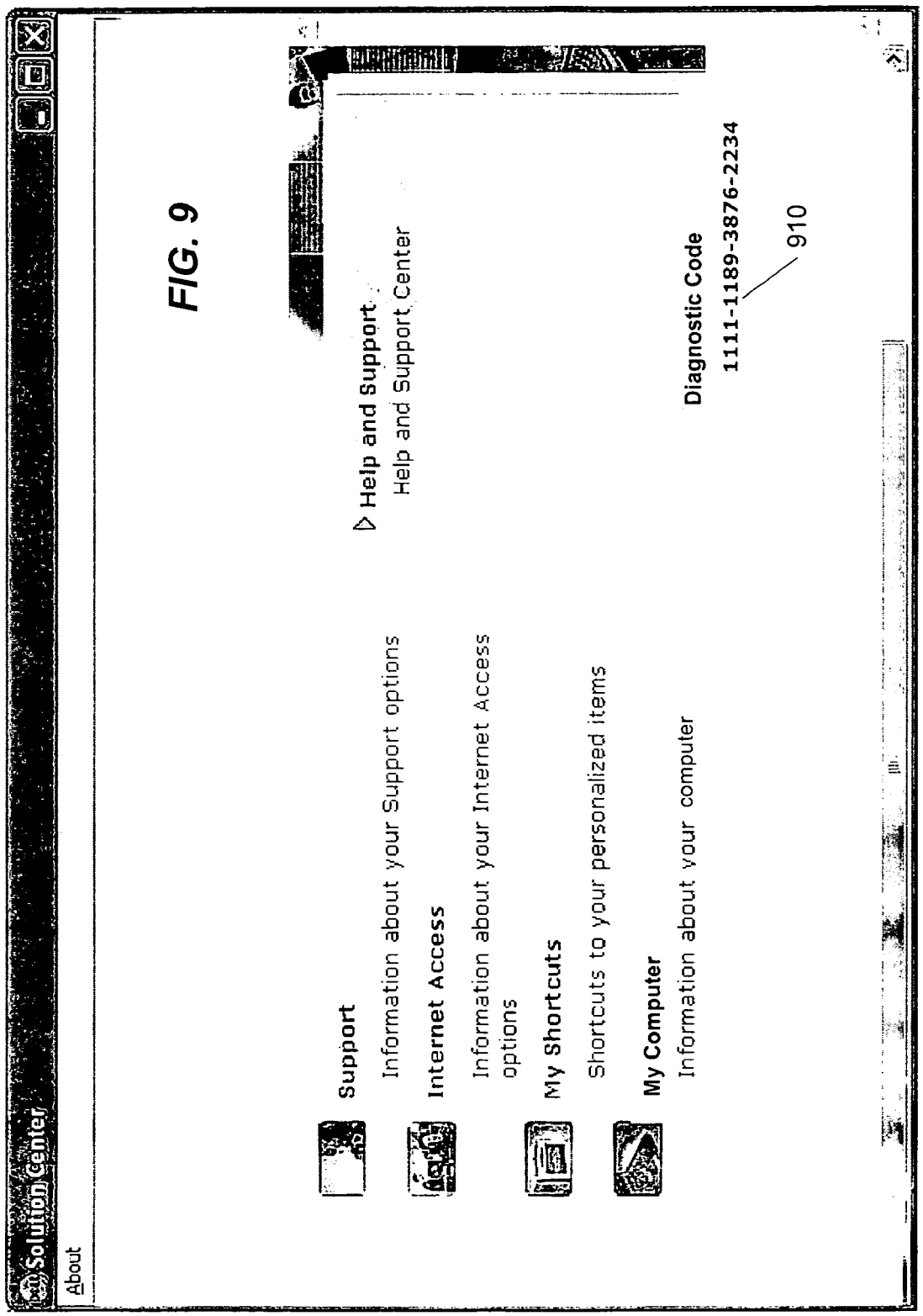
FIG. 9 is an example of a web page to which a user's browser can be redirected during a coordinated search session such as that shown in FIG. 6.

FIG. 9 is an example of a web page to which a user's browser can be redirected during a coordinated search session such as that shown in FIGS. 7 and 8. A diagnostic code 910 is provided to the user. While the web page shown in FIG. 9 is an example of an initial web page for collecting data via a web channel, the diagnostic code represented by diagnostic code 910 can provide a summary of all diagnostic information collected thus far via other communication channels, as described with reference to "Identify Related Diagnostic Information" step 215 of FIG. 2. Diagnostic information gathered via the web page can be associated with data collected from the user via the associated telephone call.

Figure 10:
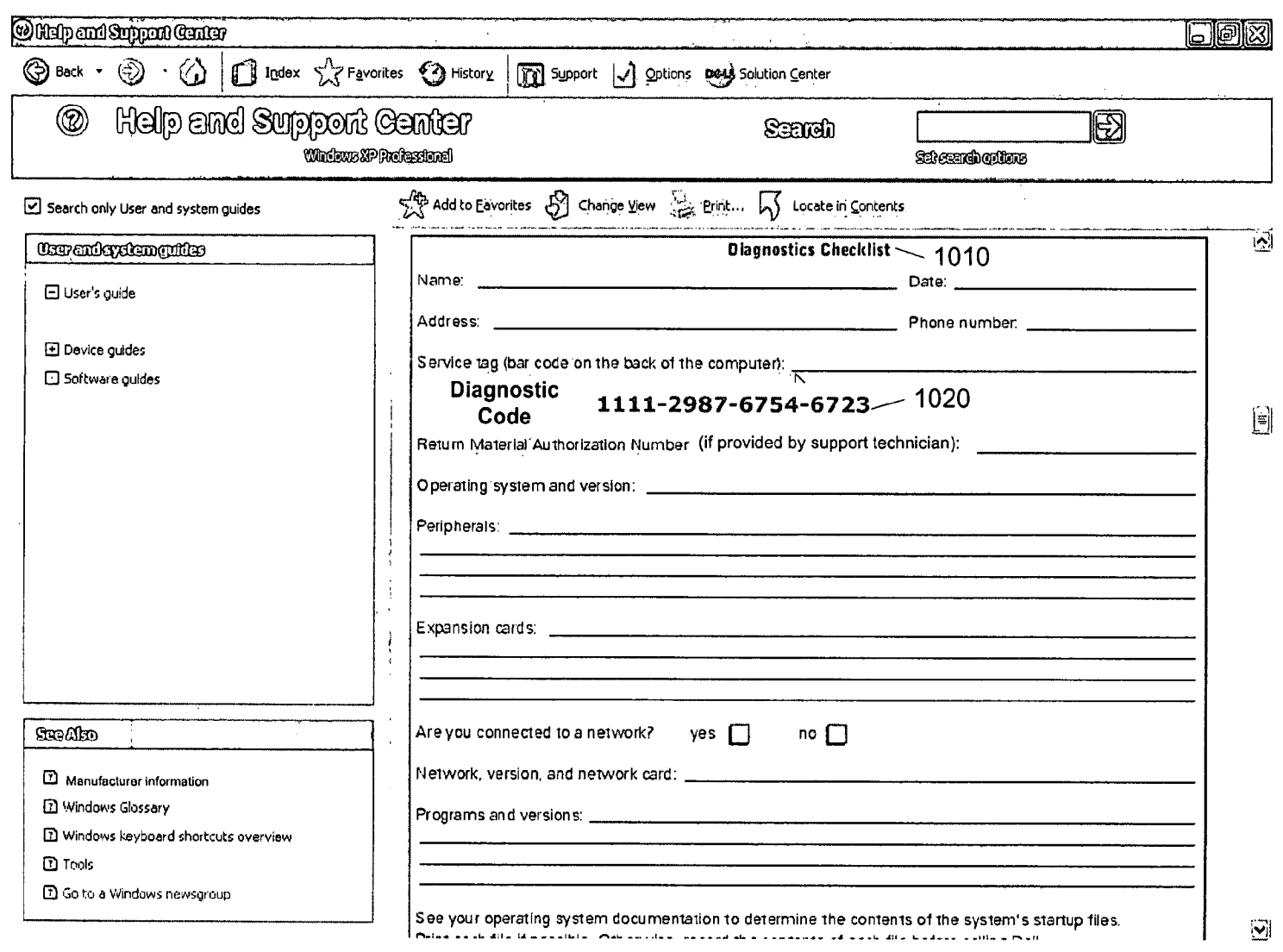

FIG. 10 is an example of a web page providing a diagnostic checklist 1010 that the user can complete providing additional diagnostic information collected about the user's computer system via a web communication channel such as that described with reference to FIGS. 5-8. Some of the data in the checklist can be automatically completed by diagnostic software running on the user's computer system (or other problem entity). Note that the web page also includes a diagnostic code 1020, summarizing the results of diagnostic tests and results as well as the user's current location within the self-service web pages.

Figure 11:
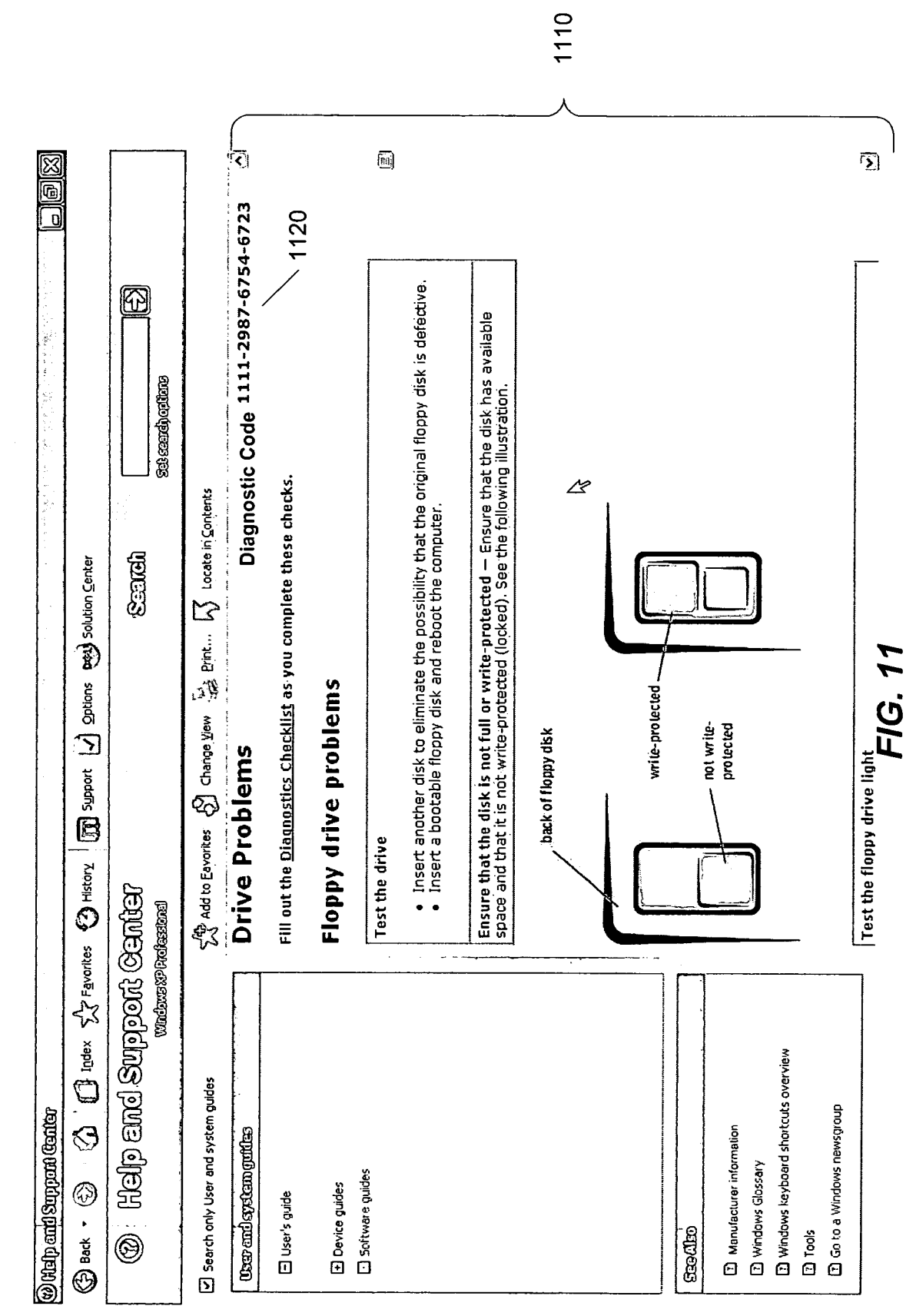

FIG. 11 is another example of a web page to which a user's browser can be redirected during a coordinated search session in which the user indicates a problem with a floppy disk drive. Web page 1110 provides directions for testing a floppy drive on the user's computer system. This web page also can be accessed, for example, by clicking a link on diagnostic checklist 1010 of FIG. 10 to obtain more specific information about diagnosing floppy drive problems. In this example, diagnostic code 1020 from FIG. 10 is identified on web page 1110. Information gathered when the user follows the directions on web page 1110 can be completed automatically as part of diagnostic checklist 1010, including the results of the floppy disk test. These new test results may result in a new diagnostic code being provided in place of diagnostic code 910 of FIG. 9 and/or diagnostic code 1020 in FIG. 10 when the user returns to the web page including diagnostic checklist 1010.

An Example Computing and Network Environment

Figure 12:
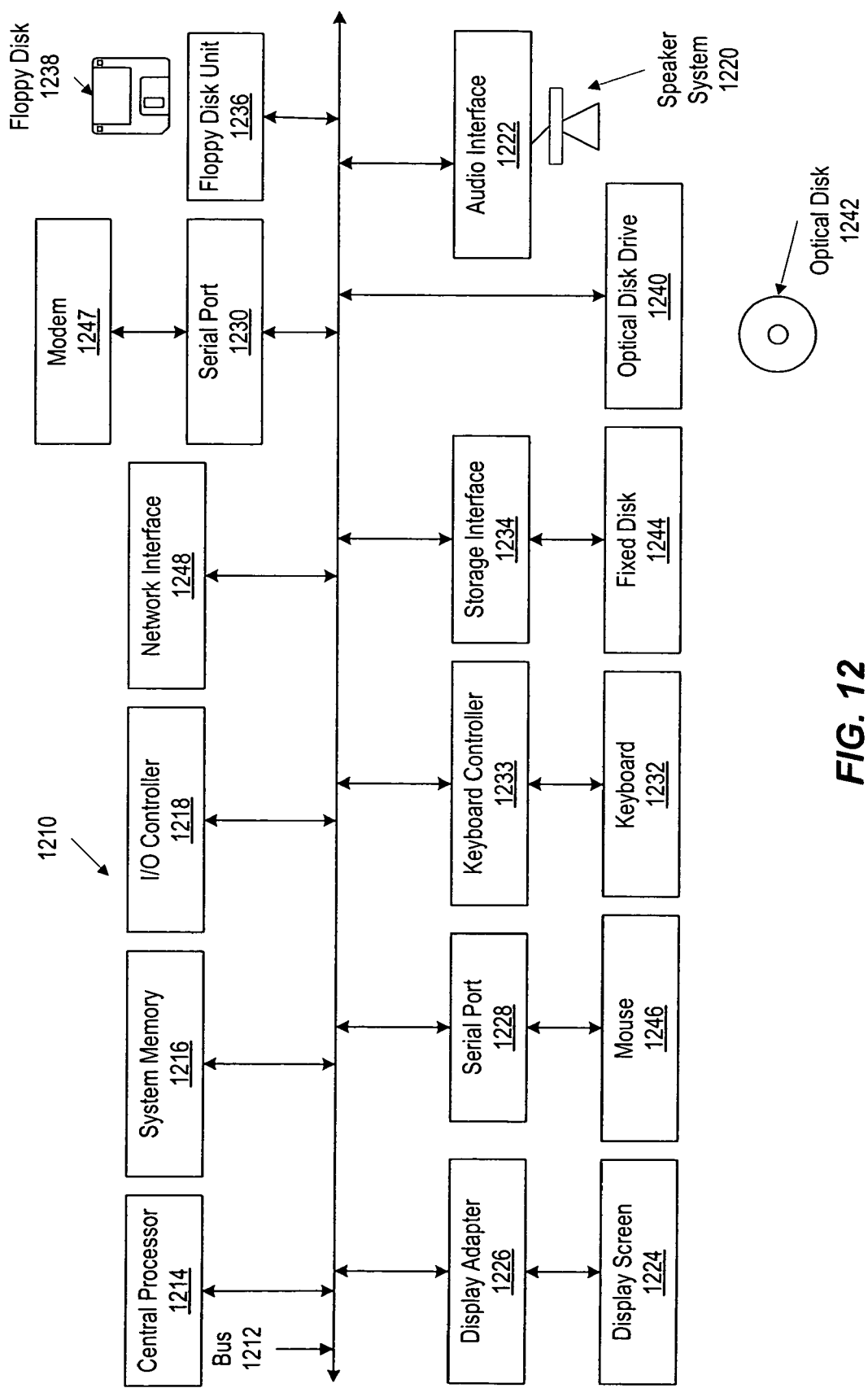
FIG. 12 is a block diagram illustrating a computer system suitable for implementing embodiments of the present invention.

FIG. 12 depicts a block diagram of a computer system 1210 suitable for implementing the present invention. Computer system 1210 includes a bus 1212 which interconnects major subsystems of computer system 1210 such as a central processor 1214, a system memory 1216 (typically RAM, but which may also include ROM, flash RAM, or the like), an input/output controller 1218, an external audio device such as a speaker system 1220 via an audio output interface 1222, an external device such as a display screen 1224 via display adapter 1226, serial ports 1228 and 1230, a keyboard 1232 (interfaced with a keyboard controller 1233), a storage interface 1234, a floppy disk drive 1236 operative to receive a floppy disk 1238, and a CD-ROM drive 1240 operative to receive a CD-ROM 1242. Also included are a mouse 1246 (or other point-and-click device, coupled to bus 1212 via serial port 1228), a modem 1247 (coupled to bus 1212 via serial port 1230) and a network interface 1248 (coupled directly to bus 1212).

Bus 1212 allows data communication between central processor 1214 and system memory 1216, which may include both read only memory (ROM) or flash memory (neither shown), and random access memory (RAM) (not shown), as previously noted. The RAM is generally the main memory into which the operating system and application programs are loaded and typically affords at least 64 megabytes of memory space. The ROM or flash memory may contain, among other code, the Basic Input-Output system (BIOS) which controls basic hardware operation such as the interaction with peripheral components. Applications resident with computer system 1210 are generally stored on and accessed via a computer readable medium, such as a hard disk drive (e.g., fixed disk 1244), an optical drive (e.g., CD-ROM drive 1240), floppy disk unit 1236 or other storage medium. Additionally, applications may be in the form of electronic signals modulated in accordance with the application and data communication technology when accessed via network modem 1247 or interface 1248.

Storage interface 1234, as with the other storage interfaces of computer system 1010, may connect to a standard computer readable medium for storage and/or retrieval of information, such as a fixed disk drive 1244. Fixed disk drive 1244 may be a part of computer system 1210 or may be separate and accessed through other interface systems. Modem 1247 may provide a direct connection to a remote server via a telephone link or to the Internet via an internet service provider (ISP). Network interface 1248 may provide a direct connection to a remote server via a direct network link to the Internet via a POP (point of presence). Network interface 1248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 12 to be present to practice the present invention. The devices and subsystems may be interconnected in different ways from that shown in FIG. 12. The operation of a computer system such as that shown in FIG. 12 is readily known in the art and is not discussed in detail in this application. Code to implement the present invention may be stored in computer-readable storage media such as one or more of system memory 1216, fixed disk 1244, CD-ROM 1242, or floppy disk 1238. Additionally, computer system 1210 may be any kind of computing device, and so includes personal data assistants (PDAs), network appliances, X-window terminals, digital set top boxes, or other such computing devices. The operating system provided on computer system 1210 may be MS-DOS®, MS-WINDOWS®, OS/2®, UNIX®, Linux® or other known operating system. Computer system 1210 also supports a number of Internet access tools, including, for example, an HTTP-compliant web browser having a JavaScript interpreter, such as Netscape Navigator®, Microsoft Explorer®, and the like.

Figure 13:
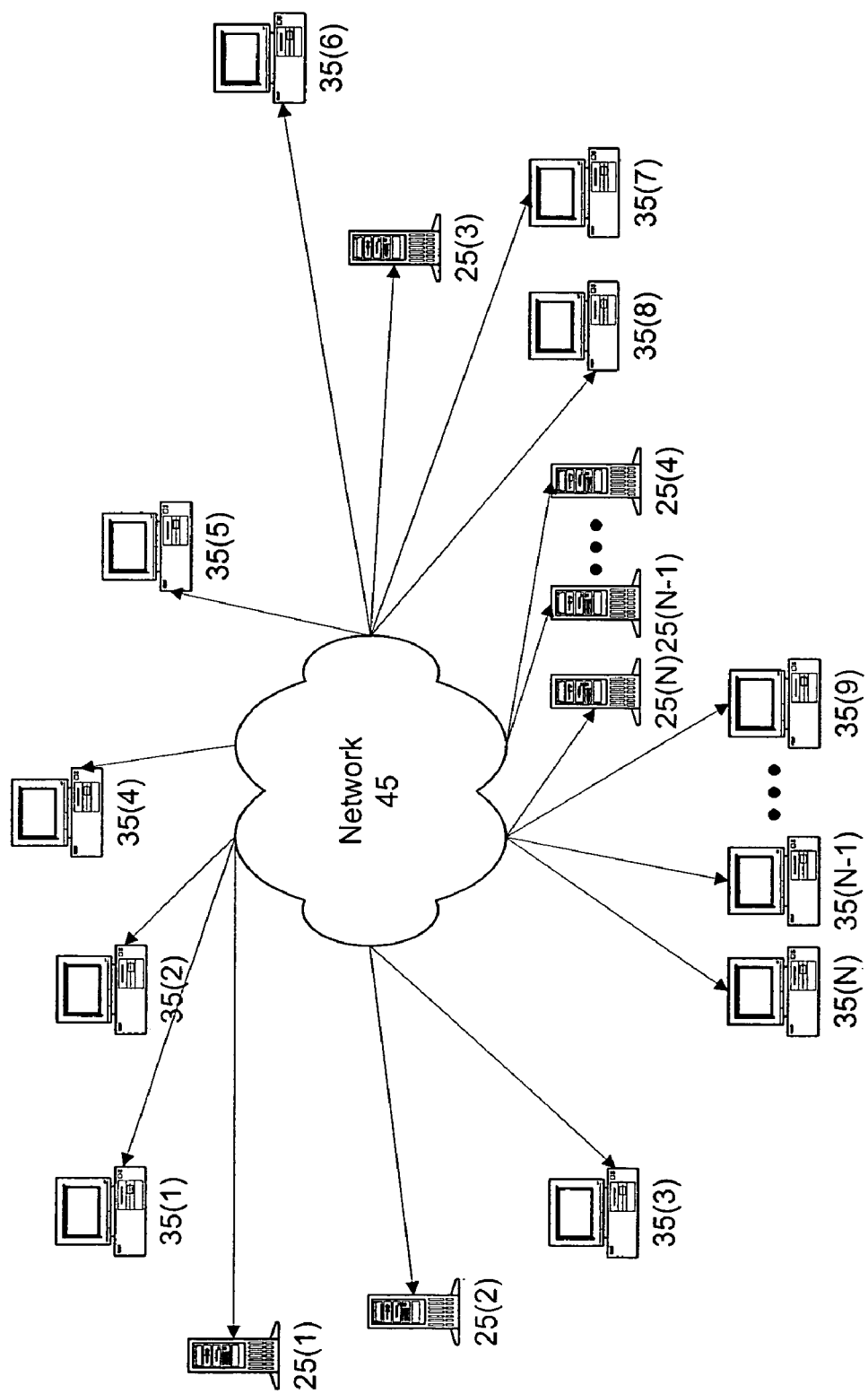
FIG. 13 is a diagram illustrating a network environment suitable for implementing embodiments of the present invention.

FIG. 13 illustrates a network environment in which the present invention may be practiced. The present invention is not limited to such a network environment and may be implemented using a variety of communication protocols and network architectures. As is illustrated in the example of FIG. 13, network 45, such as a private wide area network (WAN) or the Internet, includes a number of networked servers 25(1)-(N) that are accessible by client computers 35(1)-(N). Communication between client computers 35(1)-(N) and servers 25(1)-(N) typically occurs over a publicly accessible network, such as a public switched telephone network (PSTN), a DSL connection, a cable modem connection or large bandwidth trunks (e.g., communications channels providing T1 or OC3 service).

Client computers 35(1)-(N) access servers 25(1)-(N) through, for example, a service provider. An example of a service provider includes an Internet Service Provider (ISP) such as America On-Line™, Prodigy™, CompuServe™ or the like. Access is obtained by executing application-specific software (e.g., network connection software and a browser) on the given one of client computers 35(1)-(N). In one embodiment, this application-specific software can include a diagnostic client, such as one of diagnostic clients 134A and 134B of FIGS. 1A through 1D.

As a result of using a publicly accessible network for network 45, client computers 35(1)-(N) and servers 25(1)-(N) can be distributed, for example, among one or more businesses or physical locations. One of client computers 35(1)-(N) and one of servers 25(1)-(N) may be physically close, such as in the same building, or physically distant, as when the client computer is located in a user's home and the server is at a business.

The variable identifier "N" is used in several instances in FIG. 13 to more simply designate the final element (e.g., servers 25(1)-(N) and client computers 35(1)-(N)) of a series of related or similar elements (e.g., servers and client computers). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

When diagnosing a problem with a given computer system, other clients, other servers, and connected devices may all be examined as part of gathering diagnostic information. In this sense, diagnosing a problem with a given computer system may involve determining that another component of the network is the source of the problem. This diagnostic information can be reported to the user via the telephone channel and/or other communication channel as well as to the customer service agent as part of the diagnostic information.

Regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above-described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing describes an embodiment wherein some components are contained within other components (e.g., the elements shown as example components of receiving module 120 in FIG. 1D). It is to be understood that such depicted architectures are merely examples; in fact, many other architectures can be implemented that achieve the same functionality. In an abstract, but still definite sense, any arrangement of components to achieve the same functionality is effectively "associated" such that the desired functionality is achieved. Hence, any components herein combined to achieve a particular functionality can be seen as "associated" such that the desired functionality is achieved, irrespective of architectures or intermediate components. Likewise, any components so associated can also be viewed as being "operably connected," or "operably coupled" to each other to achieve the desired functionality.

The present invention enables the user to gather information via multiple communication channels and to receive guidance when navigating self-help services via two coordinated communication channels. Data can be gathered, the computer system or other problem entity identified, and a variety of diagnostic sources can be used to determine the cause of a user's problem, without the need to consult with a customer service agent and requiring less of the user's time. The user can receive web page-specific guidance from an automated voice application to navigate a self-service help session, thereby having a better user experience and becoming familiar with the self-service software. If the problem ultimately is escalated to a live agent, data collected via both the telephone and web channels (or other types of communication channels) are available so that the agent has a summary of all diagnostic information gathered thus far.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

In one embodiment, the computer systems that are diagnosed, such as computer systems 114A through 114D of FIGS. 1A through 1D, are digital set top boxes. A set-top box is a device that enables a television set to become a user interface to receive and decode digital television (DTV) broadcasts. In the Internet realm, a set-top box is a specialized computer system that includes a web browser, or HTTP client, that can communicate via the Internet using TCP/IP. The digital set-top box is connected via a telephone line to a service, such as a cable television service.

For digital television (DTV) broadcasts, a typical digital set-top box includes one or more microprocessors for running the operating system, such as Linux® or Windows CE, and for parsing the input transport stream, which is typically in MPEG format. A set-top box also typically includes RAM, an MPEG decoder chip, and one or more chips for audio decoding and processing. Some digital set-top boxes include a hard drive for storing recorded television broadcasts, for downloaded software, and for other applications provided by a DTV service provider.

Given the capability described for accessing other related software systems and back-end systems, the target of the diagnosis can be extended to not only the computer system, but also to the network environment in which the computer system operates. For example, data can be gathered from each of servers 35(1)-(N) of FIG. 13, as well as from other devices and peripherals (not shown in FIG. 13) that are available to each of client computer systems 25(1)-(N) via network 45.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
providing an automated option via a first communication channel of a first type during a first communication with a server via the first communication channel, wherein the automated option comprises a link to be displayed on a web page;
receiving a second communication with the server via a second communication channel, the second communication comprising a speech or DTMF signal;
coordinating the first communication channel with the second communication channel, said coordinating including:
determining, after said receiving, that the second communication is related to the first communication; and
transmitting, via the second communication channel, a computer generated voice message that includes an instruction to select the link.

2. The method of claim 1 further comprising:
obtaining a first identifier for first data related to the first communication;
obtaining a second identifier for second data related to the second communication;
if the first identifier and the second identifier are the same, using at least one of the first data and the second data to perform an action during at least one of the first communication and the second communication.

3. The method of claim 2 wherein
at least one of the first data and the second data comprises a diagnostic code, and the action comprises providing second information decoded from the diagnostic code.

4. The method of claim 3 wherein
the second information comprises at least one of
telemetry data, and
diagnostic information.

5. The method of claim 3 further comprising:
providing the second information for viewing.

6. The method of claim 2 wherein
the action comprises
providing third data obtained using at least one of the first identifier and the second identifier.

7. The method of claim 2 wherein
the action comprises
providing a second automated option during at least one of the first communication and the second communication.

8. The method of claim 2 wherein
the action comprises
providing a second automated suggestion to select a second automated option provided during at least one of the first communication and the second communication.

9. The method of claim 2 wherein
the first data are unavailable via the second communication channel, and
the second data are unavailable via the first communication channel.

10. The method of claim 2 wherein
at least one of the first data and the second data comprises diagnostic information for a problem with a computer system.

11. The method of claim 2 wherein
at least one of the first data and the second data comprises information for identifying a computer system.

12. The method of claim 1 wherein
a first one of the first and second communication channels is a telephone channel; and
a second one of the first and second communication channels is a web channel.

13. The method of claim 1 further comprising:
gathering data related to a problem with a problem entity via at least one of the first communication channel and the second communication channel.

14. The method of claim 1, wherein selecting the link initiates a diagnostic test.

15. The method of claim 1, wherein said computer generated voice message is formed in response to said speech or DTMF signal.

16. A system comprising:
first providing means for providing an automated option via a first communication channel of a first type during a first communication with a server via the first communication channel, wherein the automated option comprises a link to be displayed on a web page;
receiving means for receiving a second communication with the server via a second communication channel, the second communication comprising a speech or DTMF signal;
coordination means for coordinating the first communication channel with the second communication channel subsequent to receiving the second communication, said coordinating including:
determining that the second communication is related to the first communication; and
transmitting, via the second communication channel, a computer generated voice that includes an instruction to select the link.

17. The system of claim 16 further comprising:
first obtaining means for obtaining a first identifier for first data related to the first communication;
second obtaining means for obtaining a second identifier for second data related to the second communication;
using means for using at least one of the first data and the second data to perform an action during at least one of the first communication and the second communication if the first identifier and the second identifier are the same.

18. The system of claim 17 further comprising:
third providing means for providing second information decoded from a diagnostic code, wherein
at least one of the first data and the second data comprises the diagnostic code.

19. The system of claim 17 further comprising:
third providing means for providing third data obtained using at least one of the first identifier and the second identifier.

20. The system of claim 17 further comprising:
third providing means for providing a second automated option during at least one of the first communication and the second communication.

21. The system of claim 16, wherein selecting the link initiates a diagnostic test.

22. The system of claim 16, wherein said computer generated voice message is formed in response to said speech or DTMF signal.

23. A system comprising:
a first module configured to provide an automated option via a first communication channel of a first type during a first communication with a server via the first communication channel, wherein the automated option comprises a link to be displayed on a web page;
a receiving module configured to receive a second communication with the server via a second communication channel, the second communication comprising a speech or DTMF;
a determining module configured to coordinate the first communication channel with the second communication channel subsequent to receiving the second communication, said coordinating including determining, after receiving the second communication, that the second communication is related to the first communication; and
a second module configured to transmit, via the second communication channel, a computer generated voice message that includes an instruction to select the link.

24. The system of claim 23 further comprising:
a first obtaining module configured to obtain a first identifier for first data related to the first communication;
a second obtaining module configured to obtain a second identifier for second data related to the second communication;
a using module configured to use at least one of the first data and the second data to perform an action during at least one of the first communication and the second communication if the first identifier and the second identifier are the same.

25. The system of claim 24 further comprising:
a third providing module configured to provide second information decoded from a diagnostic code, wherein
at least one of the first data and the second data comprises the diagnostic code.

26. The system of claim 24 further comprising:
a third providing module configured to provide third data obtained using at least one of the first identifier and the second identifier.

27. The system of claim 23, wherein selecting the link initiates a diagnostic test.

28. The system of claim 23, wherein said computer generated voice message is formed in response to said speech or DTMF signal.

29. A computer-readable medium that stores instructions, the instructions comprising:
first instructions configured to provide an automated option via a first communication channel of a first type during a first communication with a server via the first communication channel, wherein the automated option comprises a link to be displayed on a web page;
receiving instructions configured to accept a second communication with the server via a second communication channel, the second communication comprising a speech or DTMF signal; and
coordinating instructions configured to coordinate the first communication channel with the second communication channel, said coordinating instructions including:
determining instructions configured to determine, after said receiving instructions accept the second communication, that the second communication is related to the first communication; and
second instructions configured to provide, via the second communication channel, a computer generated voice message that includes an instruction to select the link.

30. The computer-readable medium of claim 29 wherein the instructions further comprise:
first obtaining instructions configured to obtain a first identifier for first data related to the first communication;
second obtaining instructions configured to obtain a second identifier for second data related to the second communication;
using instructions configured to use at least one of the first data and the second data to perform an action during at least one of the first communication and the second communication if the first identifier and the second identifier are the same.

31. The computer-readable medium of claim 30 wherein the instructions further comprise:
third providing instructions configured to provide second information decoded from a diagnostic code, wherein
at least one of the first data and the second data comprises the diagnostic code.

32. The computer-readable medium of claim 30 wherein the instructions further comprise:
third providing instructions configured to provide third data obtained using at least one of the first identifier and the second identifier.

33. The computer-readable medium of claim 29, wherein selecting the link initiates a diagnostic test.

34. The computer-readable medium of claim 29, wherein said computer generated voice message is formed in response to said speech or DTMF signal.

35. A computer system comprising:
a processor for executing instructions; and
a memory to store the instructions, wherein the instructions comprise
first instructions configured to provide an automated option via a first communication channel of a first type during a first communication with a server via the first communication channel, wherein the automated option comprises a link to be displayed on a web page;
receiving instructions configured to accept a second communication with the server via a second communication channel, the second communication comprising a speech or DTMF signal; and
coordinating instructions configured to coordinate the first communication channel with the second communication channel, said coordinating instructions including:
determining instructions configured to determine, after said receiving instructions accept the second communication, that the second communication is related to the first communication; and
second instructions configured to provide, via the second communication channel, a computer generated voice that includes an instruction to select the link.

36. The computer system of claim 35 wherein the instructions further comprise:
first obtaining instructions configured to obtain a first identifier for first data related to the first communication;
second obtaining instructions configured to obtain a second identifier for second data related to the second communication;
using instructions configured to use at least one of the first data and the second data to perform an action during at least one of the first communication and the second communication if the first identifier and the second identifier are the same.

37. The computer system of claim 36 wherein the instructions further comprise:
third providing instructions configured to provide second information decoded from a diagnostic code, wherein
at least one of the first data and the second data comprises the diagnostic code.

38. The computer system of claim 36 wherein the instructions further comprise:
third providing instructions configured to provide third data obtained using at least one of the first identifier and the second identifier.

39. The computer system of claim 35, wherein selecting the link initiates a diagnostic test.

40. The computer system of claim 35, wherein said computer generated voice message is formed in response to said speech or DTMF signal.

* * * * *